United States Patent
Merino Vazquez et al.

(10) Patent No.: US 11,172,017 B2
(45) Date of Patent: Nov. 9, 2021

(54) FIRST FRONT-END NODE, CLIENT NODE, LOAD BALANCER NODE, AND METHODS PERFORMED THEREBY, FOR SUPPORTING DATA COMMUNICATION

(71) Applicant: Telefonaktiebolaget LM Ericsson (publ), Stockholm (SE)

(72) Inventors: Emiliano Merino Vazquez, Madrid (ES); Maria Cruz Bartolomé Rodrigo, Madrid (ES); Jose Miguel Dopico Sanjuan, Madrid (ES); David Gutierrez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/648,025

(22) PCT Filed: Oct. 10, 2017

(86) PCT No.: PCT/EP2017/075821
§ 371 (c)(1),
(2) Date: Mar. 17, 2020

(87) PCT Pub. No.: WO2019/063106
PCT Pub. Date: Apr. 4, 2019

(65) Prior Publication Data
US 2020/0280605 A1    Sep. 3, 2020

(30) Foreign Application Priority Data
Sep. 29, 2017  (EP) .................................... 17382651

(51) Int. Cl.
*G06F 15/173* (2006.01)
*H04L 29/08* (2006.01)
(Continued)

(52) U.S. Cl.
CPC ............ *H04L 67/101* (2013.01); *H04L 45/42* (2013.01); *H04L 67/1027* (2013.01); *H04L 67/1097* (2013.01); *H04L 69/40* (2013.01)

(58) Field of Classification Search
CPC ............... H04L 67/101; H04L 67/1027; H04L 67/1097; H04L 45/42; H04L 69/40
See application file for complete search history.

(56) References Cited

U.S. PATENT DOCUMENTS

2010/0299451 A1\* 11/2010 Yigang ............... H04L 65/1016
709/241
2013/0091041 A1    4/2013 Sharma
(Continued)

OTHER PUBLICATIONS

3GPP TS 23.335 V14.0.0; 3rd Generation Partnership Project; Technical Specification Group Core Network and Terminals; User Data Convergence (UDC); Technical realization and information flows; Stage 2 (Release 14); Mar. 2017, consisting of 39-pages.
(Continued)

*Primary Examiner* — Richard G Keehn
(74) *Attorney, Agent, or Firm* — Christopher & Weisberg, P.A.

(57) ABSTRACT

A method is performed by a first front-end node, for supporting data communication. The first front-end node operates in a communications network comprising a pool of front-end nodes for providing access to a database. The pool of front-end nodes includes the first front-end node. The first front-end node receives, from a load balancer node, a first request for data from the database, from a client node. The first front-end node provides, to the client node, a first response to the received first request, the first response including a first indication indicating that the first front-end node is a preferred node for providing a subsequent response to a subsequent request for data from the client node. The
(Continued)

subsequent response is allowed to originate from another front-end node in the pool of front-end nodes, different than the preferred node.

20 Claims, 13 Drawing Sheets

(51) Int. Cl.
*H04L 12/717* (2013.01)
*H04L 29/14* (2006.01)

(56) References Cited

U.S. PATENT DOCUMENTS

2016/0381019 A1 12/2016 Modi et al.
2017/0257755 A1* 9/2017 Kotecha .............. H04L 67/1029

OTHER PUBLICATIONS

International Search Report and Written Opinion dated May 16, 2018 for International Application No. PCT/EP2017/075821 filed on Oct. 10, 2017, consisting of 11-pages.

* cited by examiner a)

b)

a)

b)

a)

b)

US 11,172,017 B2

FIRST FRONT-END NODE, CLIENT NODE, LOAD BALANCER NODE, AND METHODS PERFORMED THEREBY, FOR SUPPORTING DATA COMMUNICATION

CROSS-REFERENCE TO RELATED APPLICATIONS

This application is a Submission Under 35 U.S.C. § 371 for U.S. National Stage Patent Application of International Application No.: PCT/EP/2017/075821, filed Oct. 10, 2017 entitled "FIRST FRONT-END NODE, CLIENT NODE, LOAD BALANCER NODE, AND METHODS PERFORMED THEREBY, FOR SUPPORTING DATA COMMUNICATION," which claims priority to European Patent Application No.: 17382651.2, filed Sep. 29, 2017, the entireties of both of which are incorporated herein by reference.

TECHNICAL FIELD

The present disclosure relates generally to a first front-end node and methods performed thereby for supporting data communication. The present disclosure also relates generally to a client node, and methods performed thereby for supporting data communication. The present disclosure additionally relates generally to a load balancer node, and methods performed thereby for supporting data communication. The present disclosure further relates generally to a computer program product, comprising instructions to carry out the actions described herein, as performed by the first front-end node, the client node, or the load balancer node. The computer program product may be stored on a computer-readable storage medium.

BACKGROUND

Computer systems may comprise one or more nodes. A node may comprise one or more processors which, together with computer program code may perform different functions and actions, a memory, a receiving and a sending port. Nodes may be comprised in a telecommunications network.

User Data Convergence (UDC) is an architecture described in the 3rd Generation Partnership Project (3GPP) TS 23.335 in which the dynamic and persistent data of the subscribers may be stored in a common storage known as a User Data Repository (UDR). Dynamic user data may be understood as data which may be changed as a consequence of a users' activity, e.g., a user powering on his phone. Persistent user data may be understood as data which does not change, regardless of the users' activity, e.g., telephone number, date of birth. The storage of both dynamic and persistent user data may allow the consumers, which may also be referred to as application Front-Ends, e.g., a Home Location Register Front-End (HLR-FE), or a Home Subscriber Server Front-End (HSS-FE), to host only business logic and remain completely user data-less, so that any given request may be served by any front-end at any given time, since all data that may be required to serve the request may be available to be fetched from the UDR. The consumers may be understood here as the network functions storing and retrieving users' data for the purpose of providing services to users, e.g., voice telephony, messaging.

Being data-less may be understood to mean that load balancing, that is, distributing the traffic from a communications network equally towards the application front-ends to share the load, thereby avoiding overload, may be done among the different application front-ends, but it also may be understood to mean that every time a request is received, the user data must be fetched from UDR, which impacts the latency/performance. This problem may become significant when massive signalling occurs. In order to mitigate this problem, some application Front-Ends perform caching to avoid fetching user data from the UDR for each and every request related to each user. Existing methods, however, may result in obsolete data being cached and later retrieved from the cache upon a request.

SUMMARY

It is an object of embodiments herein to improve the support of data communication in a communications network.

According to a first aspect of embodiments herein, the object is achieved by a method, performed by a first front-end node, for supporting data communication. The first front-end node operates in a communications network. The communications network comprises a pool of front-end nodes for providing access to a database. The pool of front-end nodes comprises the first front-end node. The first front-end node receives, from a load balancer node, a first request for data from the database. The first request for data is from a client node. The load balancer node and the client node operate in the communications network. The first front-end node provides, to the client node, a first response to the received first request. The first response comprises a first indication indicating that the first front-end node is a preferred node for providing a subsequent response to a subsequent request for data from the client node. The subsequent response is allowed to originate from another front-end node in the pool of front-end nodes. The another front-end node is different than the preferred node.

According to a second aspect of embodiments herein, the object is achieved by a method, performed by the client node, for supporting data communication. The client node operates in the communications network. The communications network comprises the pool of front-end nodes for providing access to the database. The pool of front-end nodes comprises a first front-end node. The client node provides the second indication to the load balancer node operating in the communications network. The second indication indicates that the first front-end node is the preferred node for providing the subsequent response to the subsequent request for data from the database. The subsequent request is from the client node. The second indication indicates that the first front-end node is the preferred node by indicating that i) the first front-end node is a destination host for providing the subsequent response to the subsequent request for data from the database, and ii) if the first front-end node is unavailable, the another front-end node is allowed to be selected from the pool of front-end nodes to provide the response, the different front-end node being available. The client node also receives the subsequent response to the subsequent request for data, the subsequent response being based on the provided second indication.

According to a third aspect of embodiments herein, the object is achieved by a method, performed by the load balancer node, for supporting data communication. The load balancer node operates in the communications network. The communications network comprises the pool of front-end nodes for providing access to the database. The pool of front-end nodes comprises the first front-end node. The load balancer node receives the second indication from the client node operating in the communications network. The second indication indicates that the first front-end node is the preferred node for providing the subsequent response to the subsequent request for data from the database, the subsequent request being from the client node. The second indication indicates that the first front-end node is the preferred node for providing the subsequent response by indicating that: i) the first front-end node is the destination host for providing the response to the request for data from the database, and that ii) if the first front-end node is unavailable, the another front-end node, the another front-end node being available, is allowed to be selected from the pool of front-end nodes to provide the subsequent response. The load balancer node initiates, based on the received second indication and in response to the subsequent request for data from the client node, an attempt to receive the subsequent response to the subsequent request for data. The reception of the subsequent response is first attempted from the first front-end node, and one of the following applies: i) the first front-end node is available and the subsequent response is successfully received from the first front-end node, and ii) the first front-end node is unavailable and the subsequent request is re-routed to the another front-end node, the another front-end node being available. The another front-end node is selected by the load balancer node from the pool of front-end nodes to provide the subsequent response.

According to a fourth aspect of embodiments herein, the object is achieved by the first front-end node configured to support data communication. The first front-end node is further configured to operate in the communications network. The communications network is configured to comprise the pool of front-end nodes. The pool of front-end nodes are configured to provide access to the database. The pool of front-end nodes comprise the first front-end node. The first front-end node is further configured to receive, from the load balancer node, the first request for data from the database. The first request for data is configured to be from the client node. The load balancer node and the client node are further configured to operate in the communications network. The first front-end node is further configured to provide, to the client node, the first response to the first request configured to be received. The first response is configured to comprise the first indication configured to indicate that the first front-end node is the preferred node for providing the subsequent response to the subsequent request for data from the client node. The subsequent response is configured to be allowed to originate from the another front-end node in the pool of front-end nodes. The another front-end node is different than the preferred node.

According to a fifth aspect of embodiments herein, the object is achieved by the client node configured to support data communication. The client node is further configured to operate in the communications network. The communications network is configured to comprise the pool of front-end nodes for providing access to the database. The pool of front-end nodes comprises the first front-end node. The client node is further configured to provide the second indication to the load balancer node configured to operate in the communications network. The second indication is configured to indicate that the first front-end node is the preferred node for providing the subsequent response to the subsequent request for data from the database. The subsequent request is configured to be from the client node. The second indication is configured to indicate that the first front-end node is the preferred node for providing the subsequent response by indicating that: i) the first front-end node is the destination host for providing the subsequent response to the subsequent request for data from the database, and ii) if the first front-end node is unavailable, the another front-end node is allowed to be selected from the pool of front-end nodes to provide the response, the different front-end node being available. The client node is further configured to receive the subsequent response to the subsequent request for data, the subsequent response being configured to be based on the second indication configured to be provided.

According to a sixth aspect of embodiments herein, the object is achieved by the load balancer node configured to support data communication. The load balancer node is configured to operate in the communications network. The communications network is configured to comprise the pool of front-end nodes for providing access to the database. The pool of front-end nodes is configured to comprise the first front-end node. The load balancer node is further configured to receive the second indication from the client node configured to operate in the communications network. The second indication is configured to indicate that the first front-end node is the preferred node for providing the subsequent response to the subsequent request for data from the database. The subsequent request is configured to be from the client node. The second indication is configured to indicate that the first front-end node is the preferred node for providing the subsequent response by indicating that: i) the first front-end node is the destination host for providing the subsequent response to the subsequent request for data from the database, and ii) if the first front-end node is unavailable, the another front-end node, the another front-end node being available, is allowed to be selected from the pool of front-end nodes to provide the subsequent response. The load balancer node is further configured to initiate, based on the second indication configured to be received, and in response to the subsequent request for data from the client node, the attempt to receive the subsequent response to the subsequent request for data. The reception of the subsequent response is configured to be first attempted from the first front-end node, and one of the following applies: i) if the first front-end node is available, the response is configured to be successfully received from the first front-end node, and ii) if the first front-end node is unavailable, the request is configured to be re-routed to the another front-end node, the another front-end node being configured to be available. The another front-end node is configured to be selected by the load balancer node from the pool of front-end nodes to provide the subsequent response.

According to a seventh aspect of embodiments herein, the object is achieved by a computer program. The computer program comprises instructions which, when executed on at least one processor, cause the at least one processor to carry out the method performed by the client node.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the client node.

According to a ninth aspect of embodiments herein, the object is achieved by a computer program. The computer program comprises instructions which, when executed on at least one processor, cause the at least one processor to carry out the method performed by the first front-end node.

According to a tenth aspect of embodiments herein, the object is achieved by computer-readable storage medium. The computer-readable storage medium has stored thereon a computer program comprising instructions which, when executed on at least one processor, cause the at least one processor to carry out the method performed by the first front-end node.

According to an eleventh aspect of embodiments herein, the object is achieved by a computer program. The computer program comprises instructions which, when executed on at least one processor, cause the at least one processor to carry out the method performed by the load balancer node.

According to a twelfth aspect of embodiments herein, the object is achieved by computer-readable storage medium. The computer-readable storage medium has stored thereon a computer program comprising instructions which, when executed on at least one processor, cause the at least one processor to carry out the method performed by the load balancer node.

By providing the first indication indicating that the first front-end node is the preferred node for providing the subsequent response to the subsequent request, the first front-end node enables the client node to then provide the second indication to the load balancer node. By providing the second indication to the load balancer node, indicating that the first front-end node is the preferred node for providing the subsequent response, the client node enables the load balancer node to then first attempt to receive the subsequent response from the first front-end node, and only re-route the subsequent request to the available another front-end node, if the first front-end node is unavailable. The first indication, and in turn the second indication enable both caching and failover in the communications network, as they enable to optimizes any aspect, e.g., latency, by indicating that the first front-end node may be selected first to serve the subsequent request, but not excluding alternate servers in the routing. Thus, the communications network is enhanced by introducing the concept of dynamic preference routing which provides for failover.

BRIEF DESCRIPTION OF THE DRAWINGS

Examples of embodiments herein are described in more detail with reference to the accompanying drawings, and according to the following description.

DETAILED DESCRIPTION

As part of the development of embodiments herein, a problem will first be identified and discussed.

Figure 1:
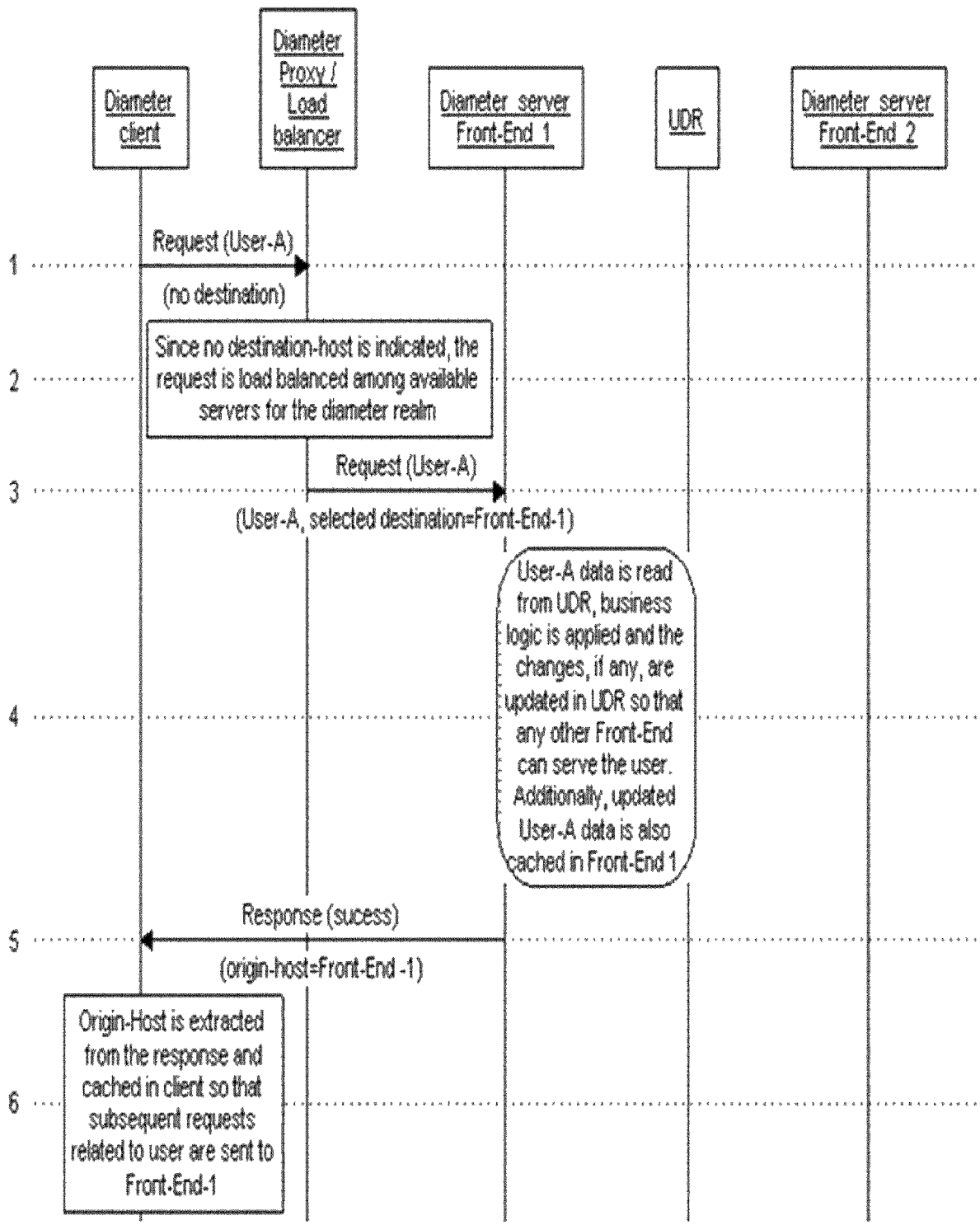
FIG. 1 is a schematic diagram illustrating a first problem of data communication according to existing methods.
Figure 1:
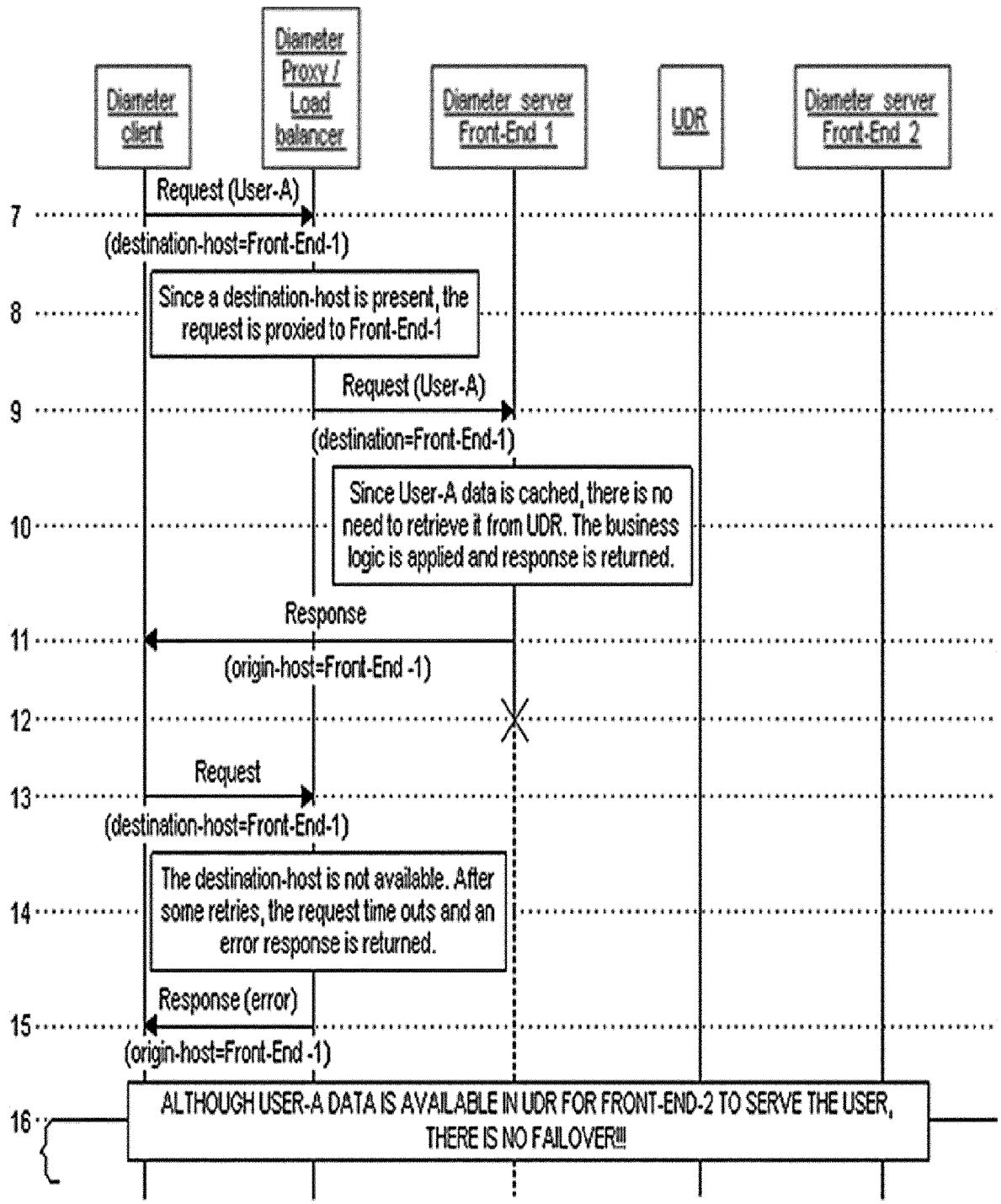
Figure 2:
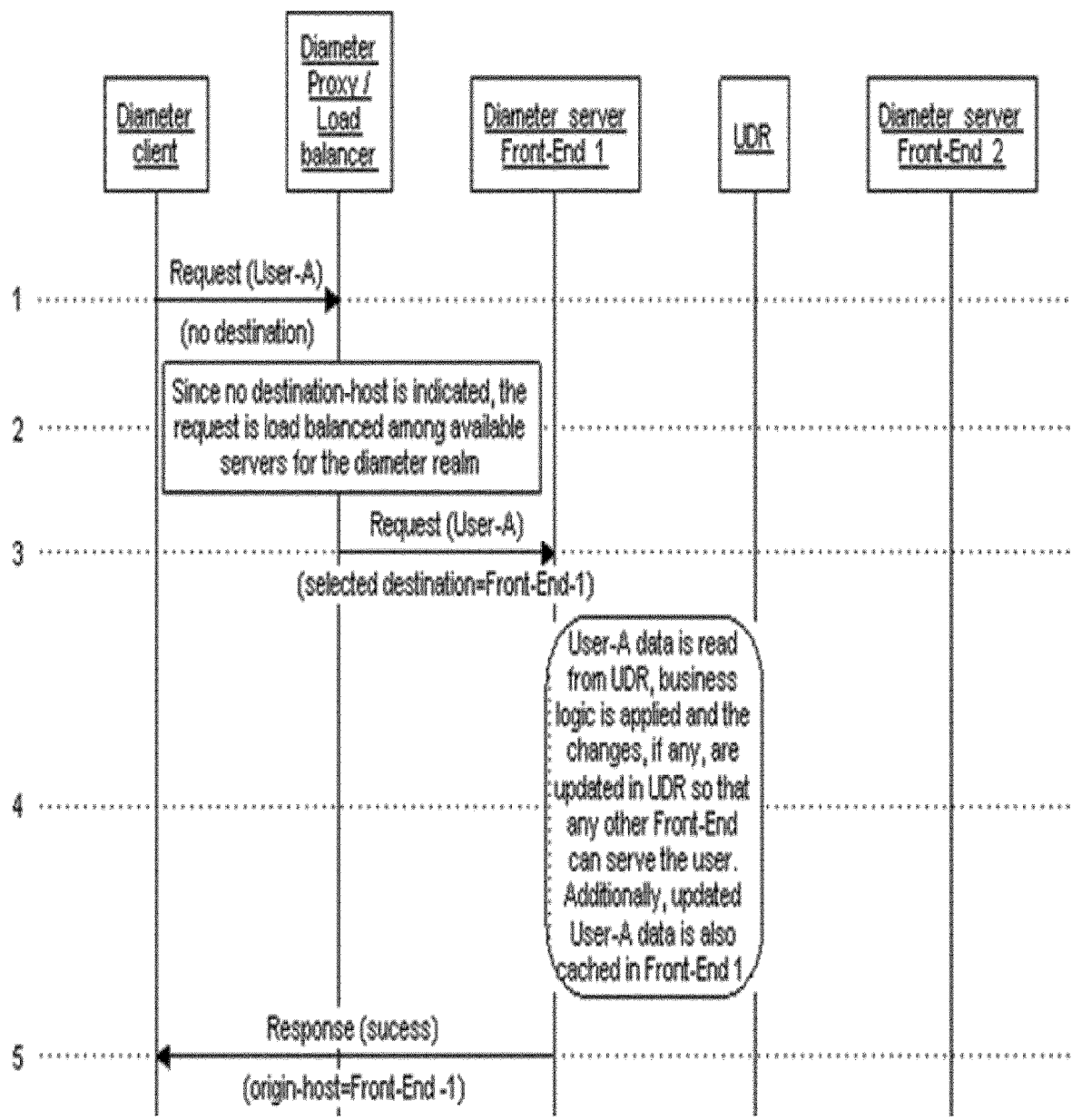
FIG. 2 is a schematic diagram illustrating a second problem of data communication according to existing methods.
Figure 2:
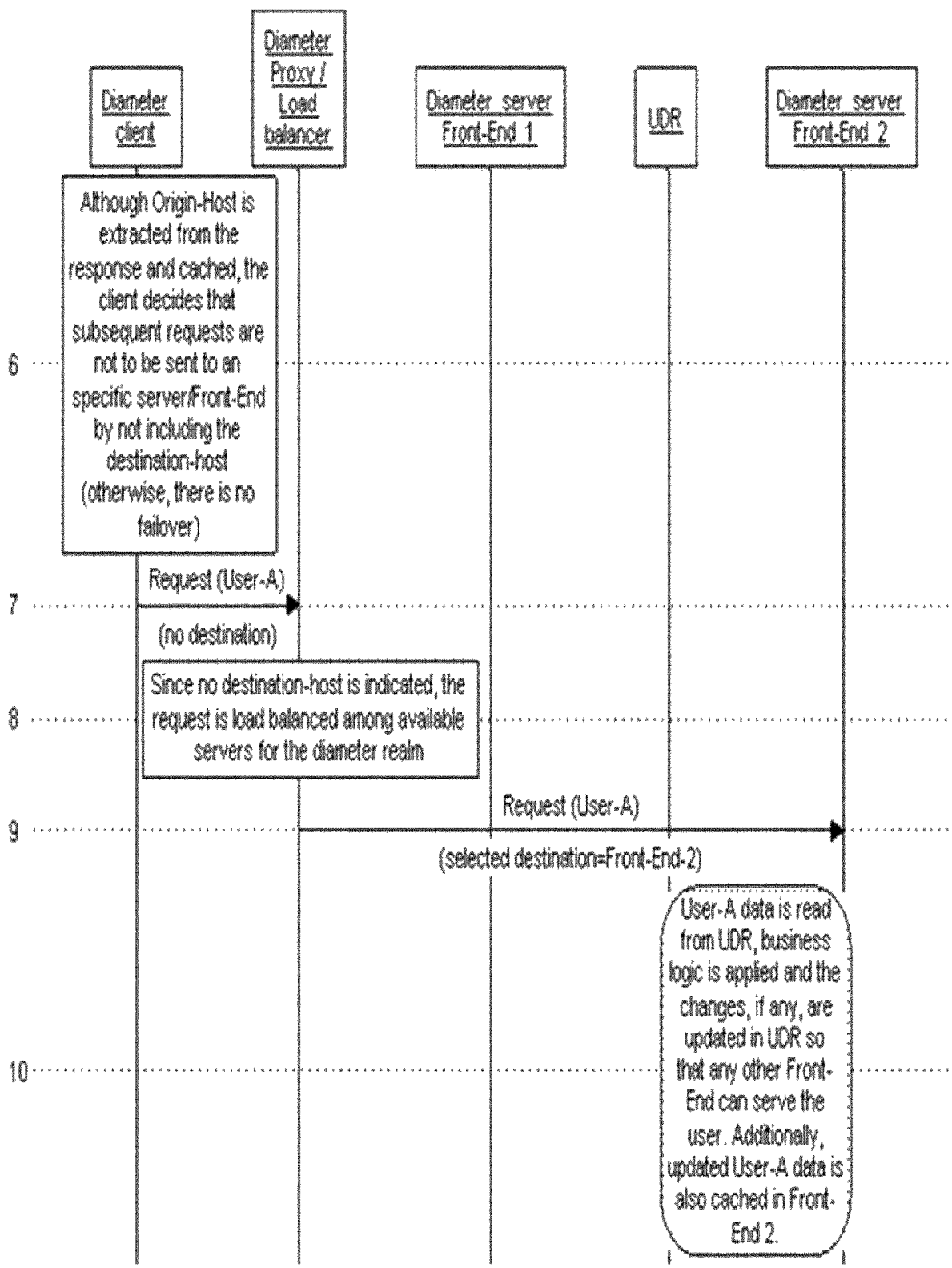
Figure 2:
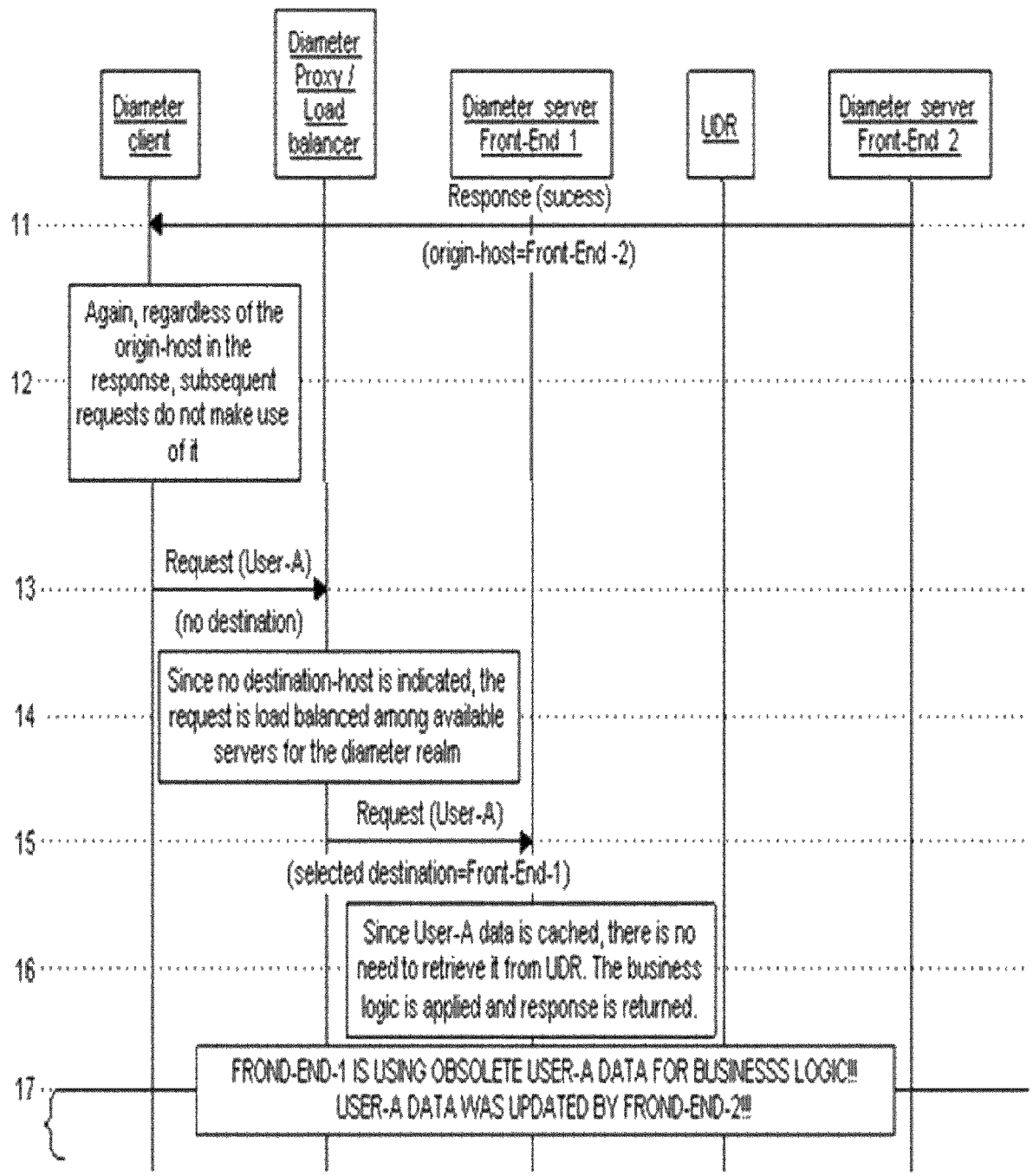

FIG. 1 and FIG. 2 describe the problems when Front-Ends decide to cache user data in a UDC architecture operating over a diameter protocol, according to existing methods.

FIG. 1 is a schematic diagram illustrating an example of the different components of a communications network and their interactions, according to existing methods, which results in the so-called failover problem of the existing methods.

In step 1, an initial request is sent for a given User-A from a client node, which is represented in the Figures as a diameter client. Here, it may be understood that User-A may be a person who owns a device, e.g., a phone, and when using the device, the network provides a functional entity, e.g., a client node such as a diameter client, who may serve the person/device. An example of a client node as a diameter client may be a node where services of a user are stored. This client node may be assigned based on the location of the user, for example. The client node in this example may be a diameter client since it requires a diameter server to fetch all data related to the person. In the case of a communications network, the client node may fetch, via front-ends, the services for the person, e.g., voice telephony, call forwarding, call waiting services. For example, every time a person powers on a device, a client node may acts on his behalf to prepare the network so that services may be used by that person. A request may be understood as a request for data, such as the public identities of the user, e.g., telephone numbers, mail addresses. Since the diameter client is not aware about a specific diameter server that may be able to serve the request, it only includes the destination realm. A destination realm may be understood as the domain which may be allowed to serve the requests and provide responses, e.g. telephoneservicesprovider.com. A Destination-Host AVP is absent, which is indicated in the Figure as "no destination". A destination host may be understood as the intended recipient of the request, that is, the node in charge of providing a response for a given request. An Attribute-Value Pair (AVP) may be understood as an information element that may be included in the request to dictate a certain behavior or assist a client node or server, so that a user may use services, e.g., telephony.

In step 2, since no destination-host is indicated in the request, the request is sent to a load balancer node or proxy. A load balancer node may be understood as a node in charge of distributing the traffic, e.g., requests such as diameter requests, among a plurality of servers or front-ends, so that the load may be shared and no overload may occur in a specific front-end. When the load balancer node receives the request, routing takes place based on the destination realm. The request is then load balanced among the available servers from the diameter realm by the load balancer node. A diameter realm may refer generically to the origin, origin-realm AVP, or destination, destination-realm AVP. A list of servers, e.g., HSS-FEs, is found for the realm and one of them is selected according to a one or more criteria. In this particular example, the available servers from the diameter realm may be understood to comprise a first Front-End 1, which is a first diameter server, and a second Front-End 2, which is a second diameter server.

In step 3, the request is forwarded to the selected server, including an indication for the User-A and the destination selected by the load balancer node, which in this particular example is Front-End-1.

In step 4, since the diameter server selected, Front-End-1, is data-less, the user data is fetched from a UDR in the system to serve the request. After business logic is run, the updated user data is written in UDR, e.g., a new registration status, so that any other Front-End in the realm may serve the user. That the user data is updated may be understood to mean that a given user data is set to a new value. For example, if a user has his phone switched-off, his status in the network is "not registered". When the user powers on his phone, his status, that is, the status of his telephone number, is updated to "registered", and additionally, the client node which may be going to serve/provide services is updated in the UDR as well, since the geographical location of the user may have changed. The Front-End 1 updates first the status of the user, which in this example is "registered" in its cache, and then it writes the status also in UDR, so that another Front-End, if it needs the status, may simply access the UDR and fetch the value "registered". Additionally, the diameter server Front-End-1 internally keeps a local copy of the user data cached, so that it may be used in subsequent requests for the User-A to avoid the need to access the UDR again.

In step 5, a successful response is returned to the user, indicating that the origin-host of the response is the Front-End-1, that is, the server providing the response to the request for User-A. A successful response may be understood as a response which indicates that the procedure went OK, e.g., that the voice telephony service is ready to be used by the user and he can make calls.

In step 6, the diameter client fetches, that is, extracts, the Origin-Host from the response and stores it as part of the User-A data. This diameter server, Front-End-1, will be the one used for next requests for User-A. The Diameter realm will not be used anymore, since the destination is now known. For example, if the user powers off his phone, the client node would use the initially learned Front-End to inform that the phone is no longer registered, that is, that the registration status is "not registered". In step 7, a new request for data is sent for User-A. The Destination-Host extracted in step 6 is now included in the request as being Front-End-1.

In steps 8-9, since the destination host is present in the request, the diameter load balancer node forwards the request to the final destination, Front-End-1.

In steps 10-11, Front-End-1 retrieves the user data from the local copy it cached in step 4, and a new successful response is returned to the user. There is no need to retrieve the data from the UDR.

In step 12, in this example, for whatever reason, e.g., a connectivity failure, Front-End-1 is unavailable, as indicated in the Figure by the cross. That is, Front-End-1 stops being reachable.

In step 13, a new request for data is sent for User-A, which again indicates that the destination host is Front-End-1.

In steps 14-15, since the final destination indicated by the client is not reachable, after some retries, the request times out and an error response, e.g., diameter UNABLE_TO_DELIVER, is returned to the client node. This is a first problem of the existing methods, as although data for User-A is still available in the UDR for another diameter server in the realm, Front-End 2, since neither the diameter client node nor the load balancer are aware of the first server behavior, the Front-End 1, for User-A and the network topology, the standard diameter routing procedures are applied, and no failover is done. Failover may be understood as finding another alternative, in this case, the Front-End 2, to serve the request, instead of returning an error to the client to inform that the request failed. In contrast to failover, in this example, if the client node indicates a destination host, the destination host is interpreted as a necessary node to supply a response, and no retrieval is attempted from an alternative node in case the indicated Front-End is unavailable. That neither the diameter client node nor the load balancer node are aware of the first server behavior may be understood as that the load balancer node and the client node do not know that Front-End 1 stored data in the UDR, so they do not know whether another server, such as Front-End 2, may be able to retrieve the data. Hence they do not know whether there is an alternative to re-route the request when Front-End 1 fails.

FIG. 2 is a schematic diagram illustrating another example of the different components of a communications network and their interactions, according to existing methods, which results in a second problem of the existing methods, that inconsistent data is cached.

Step 1-5 are the same as in FIG. 1.

In steps 6-8, although the Front-End which served the request for User-A, Front-End-1, is included as the Origin-Host, the client node is configured to not include the Destination-Host AVP. That is, although the Origin-Host was extracted from the response received in Step 5 and cached, the client node decides that subsequent requests are not to be sent to a specific server/Front-End, by not including the destination-host. This configuration choice allows the failover mechanism described above, since the load balancer will route the request again, based on the realm, as in step 2, so that any Front-End from the realm may be selected.

In steps 9-10, the Front-End selected by the load balancer, in this case Front-End-2, runs the appropriate business logic and updates data in the UDR accordingly, if required so that any other Front-End may serve the user. Additionally, Front-End-2 caches the updated User-A data.

In step 11, a successful response is returned to the client node, wherein the origin host, Front-End-2, is indicated.

Steps 12-15 are the same steps as steps 6-9, but when load balancing is performed, the initial server, Front-End-1, which is available, is selected again.

In step 16, since Front-End-1 has previously cached data for User-A at Step 4, and the Front-End-1 does not have the knowledge that another server, Front-End-2, has since then updated the data in the UDR, the Front-End-1 determines that there is no need to retrieve it from the UDR and fetches the local copy it had previously cached for User-A. However, the user data Front-End-1 has stored in its cache is not up-to-date, and this is a problem. To circumvent this problem in existing methods, no diameter server may cache user data since it may not be guaranteed that subsequent requests are reaching the same server.

However, caching in UDC is being requested by operators to avoid massive signaling towards the UDR in the event of massive signaling from the users, e.g., after a network failure. As seen above, there is no possibility to have a complete caching solution: either 1) consistent user data is ensured by steering all requests to the same Front-End and using the destination-host in subsequent diameter requests, but the failover procedure as described in FIG. 1 is not possible; or 2) the failover procedures are ensured by not steering requests to a specific Front-End, but data consistency in Front-Ends' cache is at risk, as described in FIG. 2.

The root of the problems of the existing methods described in FIGS. 1 and 2 is that diameter does not offer a protocol routing solution that may ensure both, the failover procedure, and the data consistency, since the presence of destination host in a request excludes the possibility to fallback to alternative servers within the same diameter realm which are also able to serve the requests, as in a UDC architecture. As stated in the Internet Engineering Task Force (IETF) RFC 6733 "a request that needs to be sent to a specific home server among those serving a given realm MUST contain both the Destination-Realm and Destination-Host AVPs". IETF does not provide a routing solution when there is no actual "need", but a "preference" for a request to be sent to a specific Front-End.

In order to address this problem, several embodiments are comprised herein, which may be understood to relate to providing a mechanism for diameter servers, e.g., Front-Ends, to inform the rest of the diameter entities within a realm about the possible choices in the diameter routing for subsequent requests. Embodiments herein may be based on the knowledge that a diameter server may have about its own implementation. It may be noted that in scenarios above, the Front-End may be understood as the only node who knows both following things: 1) whether the user data has been updated in the UDR after running the business logic, which means that other Front-Ends may be able to serve the user, and 2) whether the user data has been cached after running the business logic, which means that it may save queries towards the UDR to fetch user data when diameter subsequent requests may be received for the user.

As a general overview, particular embodiments herein may be understood to relate to an apparatus to enable user data caching and load balancing in UDC.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 3:
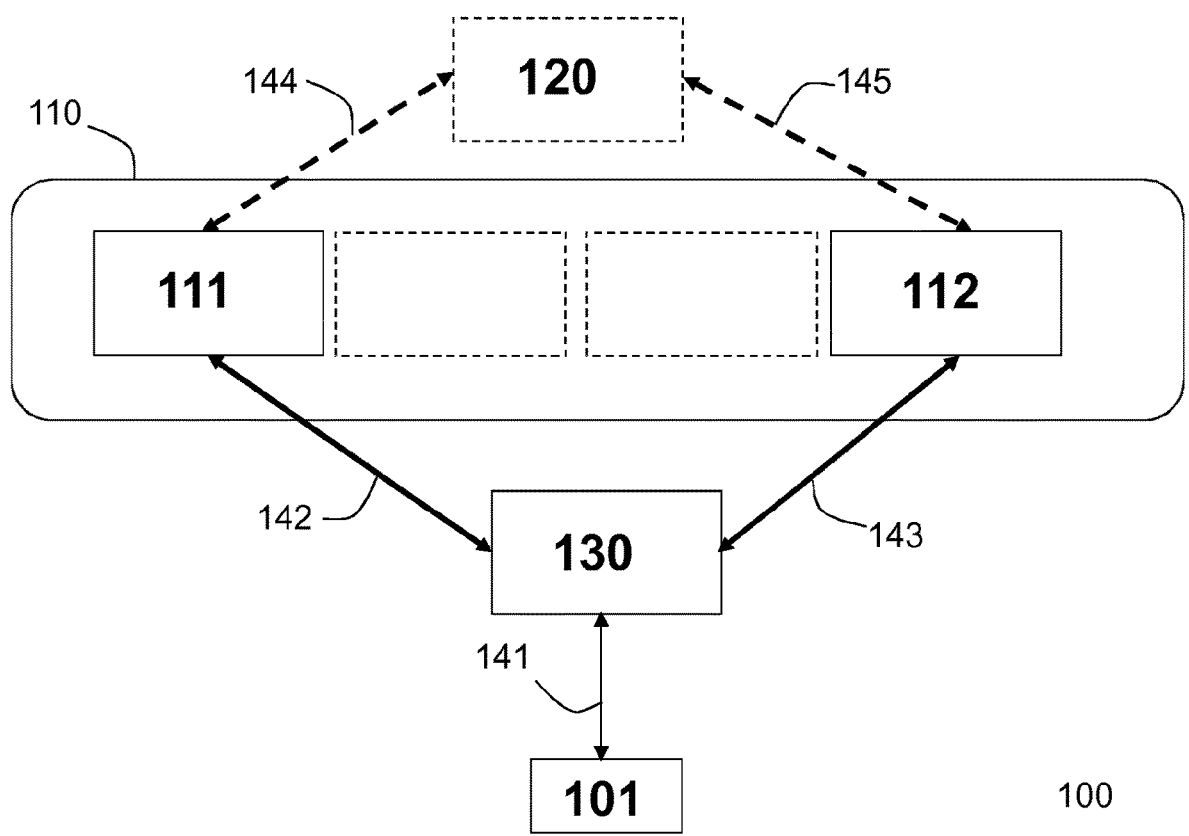
FIG. 3 is a schematic diagram illustrating a non-limiting examples of a communications network, according to embodiments herein.

FIG. 3 depicts a non-limiting example of a communications network 100, in which embodiments herein may be implemented. In some example implementations, the communications network 100 may be implemented in a telecommunications network.

The communications network 100 comprises a client server 101. The client server 101 may be understood as a computer or computer system. The client server 101 may request a service, such as a data request, for a user of the client server 101, from one or more servers, that is, one or more computers providing the service. In the communications network 100, the service may be provided by any node in a pool of front-end nodes 110 comprised in the communications network 100, whereof a first front-end node 111 and another front-end node 112 are depicted in FIG. 3. Other front-end nodes may be comprised in the pool of front-end nodes 110, as schematically indicated in FIG. 3 by the dashed boxes between the first front-end node 111 and the another front-end node 112.

The pool of front-end nodes 110 in the communications network 100 provide access to a database 120, where data for a particular user may be stored. The database 120 may be, for example, a UDR.

The communications network 100 comprises a load balancer node 130. Access to the pool of front-end nodes 110 for the client server 101 may be handled by the load balancer node 130, which may also be known as a proxy server.

Any of the front-end nodes in the pool of front-end nodes 110, e.g., the first front-end node 111 and the another front-end node 112, the client node 101 and the load balancer node 130 may be understood as a computer system. In some examples, any of the front-end nodes in the pool of front-end nodes 110 may be implemented as a standalone server in e.g., a host computer in the cloud. Any of the front-end nodes in the pool of front-end nodes 110, the client node 101 and the load balancer node 130 may in some examples be a distributed node or distributed server, with some of their respective functions being implemented locally, e.g., by a client manager, and some of its functions implemented in the cloud, by e.g., a server manager. Yet in other examples, any of the front-end nodes in the pool of front-end nodes 110, the client node 101 and the load balancer node 130 may also be implemented as processing resources in a server farm. The pool of front-end nodes 110 may be under the ownership or control of a service provider, or may be operated by the service provider or on behalf of the service provider. Any of any of the front-end nodes in the pool of front-end nodes 110 may be a diameter server. The client node 101 may be a diameter client. The load balancer node 130 may be a diameter proxy.

The client node 101, the load balancer node 130 and the first front-end node 111 may be understood to be a group of interrelated nodes.

The client node 101 may be configured to communicate within the communications network 100 with the load balancer node 130 over a first link 141, e.g., a radio link or a wired link. The load balancer node 130 may be configured to communicate within the communications network 100 with the first front-end node 111 over a second link 142, e.g., another radio link or another wired link. The load balancer node 130 may be configured to communicate within the communications network 100 with the another front-end node 112 over a third link 143, e.g., another radio link or another wired link. The first front-end node 111 may be further configured to communicate within the communications network 100 with the database 120 over a fourth link 144, e.g., another radio link, a wired link, an infrared link, etc. . . . . The another front-end node 112 may be configured to communicate within the communications network 100 with the database 120 over a fifth link 145, e.g., another radio link, a wired link, an infrared link, etc. . . . .

Any of the first link 141, the second link 142, the third link 143, the fourth link 144, and the fifth link 145 may be a direct link or it may go via one or more computer systems or one or more core networks in the communications network 100, which are not depicted in FIG. 3, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 3.

In general, the usage of "first", "second", "third", "fourth" and/or "fifth" herein may be understood to be an arbitrary way to denote different elements or entities, and may be understood to not confer a cumulative or chronological character to the nouns they modify.

Embodiments of a method, performed by the first front-end node 111, for supporting data communication, will now be described with reference to the flowchart depicted in FIG. 4. The first front-end node 111 operates in the communications network 100. As stated earlier, the communications network 100 comprises the pool of front-end nodes 110 for providing access to the database 120. The pool of front-end nodes 110 comprises the first front-end node 111.

The method comprises the following actions.

Action 401

In this Action 401, the first front-end node 111 receives, from the load balancer node 130, a first request for data from the database 120. The first request for data is from the client node 101. The load balancer node 130 and the client node 101 operate in the communications network 100. The first front-end node 111 may operate in the communications network 100 over a diameter protocol.

The receiving may be via the second link 142.

A request herein may be understood for example as a Cx-Location-Query, as defined in 3GPP TS 29.228, v. 14.4.0.

It may be understood that the first front-end node 111 may receive the first request for data from the load balancer node 130, based on a selection performed by the load balancer node 130 among the available front-end nodes in the pool of front-end nodes 110.

Action 402

Since the first front-end node 111, as origin-host, may serve the user more efficiently than other front-end nodes in the pool of front-end nodes 110, by e.g., decreasing a response latency in UDC, since traffic towards UDR is not required, it may be convenient to indicate to the client node 101 that the first front-end node 111 may be used as a first choice in a future request from the user.

In order to indicate this, and in addition enable the failover procedure to be implemented if necessary, in this Action 402, the first front-end node 111 provides, to the client node 101, a first response to the received first request. The first response comprises a first indication indicating that the first front-end node 111 is a preferred node for providing a subsequent response to a subsequent request for data from the client node 101, wherein the subsequent response is allowed to originate from another front-end node 112 in the pool of front-end nodes 110. The another front-end node 112 may be understood to be different than the preferred node.

In other words, the first front-end node 111 may indicate to a the client node 101 that the origin-host of the first response may be cached and used in subsequent requests as a "preferred" server within the realm, that is the pool of front-end nodes 110, instead of a "needed" server. Expressed differently, the first indication may indicate that the origin-host is preferred for subsequent requests, but other servers may be able to serve the user. Therefore, the subsequent request for data from the user may preferably be attempted to be fetched first from the first front-end node 111, if the first front-end node 111 is available. But, if the first front-end node 111 were to be unavailable, the subsequent request may be routed to a different front-end node in the pool of front-end nodes 110, if available.

A response herein may be understood for example as Cx-Location-Query Resp, as defined in 3GPP TS 29.228, v. 14.4.0.

The first indication may be a new diameter AVP, e.g., a first AVP. For example, in the diameter protocol, the first AVP may be understood as a routing-preference AVP. The first AVP may for example, may be indicated by a value of "1" indicating "Destination-Host preferred".

In some particular examples, the first indication may be a new AVP, wherein a first value of the AVP may indicate that the first front-end node 111 is the preferred node for providing the subsequent response to the subsequent request for data from the client node 101, and that the subsequent response is allowed to originate from another front-end node 112 in the pool of front-end nodes 110. This first value may be "1", as mentioned before. In some instances, e.g., in other subsequent responses, the first front-end node 111 may use a second value of the first indication, e.g., a value "2" to indicate that the client node 101 may use any front-end node 112 in the pool of front-end nodes 110 to provide a future response. This may occur, for example, if the memory is exhausted in the first front-end node 111, so it may not be able to cache any more, which then implies that any front-end may be equally valid.

The first response may be provided to the client node 101 via the load balancer node 130.

An advantage of Action 402 is that it enables to have both caching and failover. It enhances the diameter protocol by introducing the concept of dynamic preference routing when it comes to diameters servers implementing business logic, which optimizes any aspect, e.g., latency, when they are selected, but not excluding alternate servers in the routing.

Figure 5:
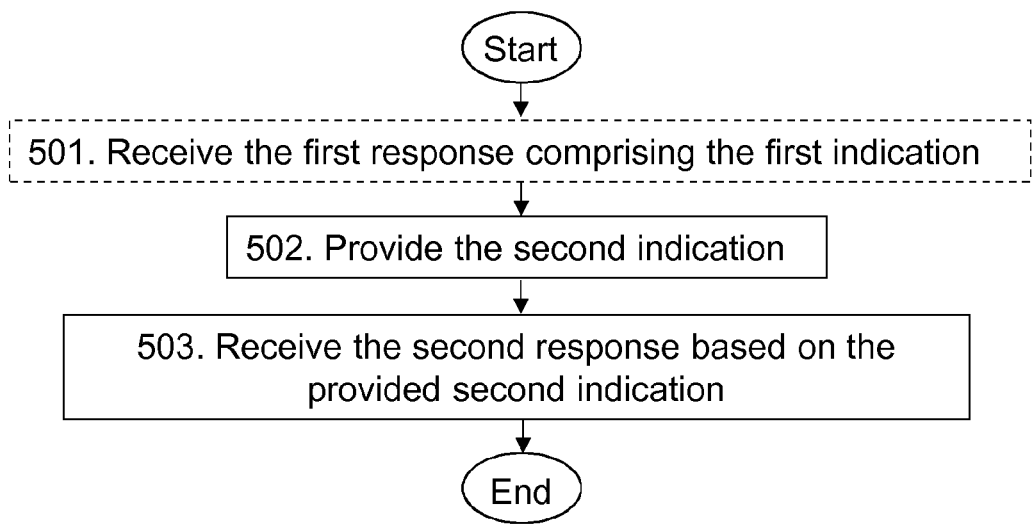
FIG. 5 is a flowchart depicting embodiments of a method in a client node, according to embodiments herein.

Embodiments of a method, performed by the client node 101, for supporting data communication, will now be described with reference to the flowchart depicted in FIG. 5. As stated earlier, the client node 101 operates in the communications network 100.

The detailed description of some of the following corresponds to the same references provided above, in relation to the actions described for the first front-end node 111, and will thus not be repeated here. For example, the communications network 100 comprises a pool of front-end nodes 110 for providing access to a database 120, and the pool of front-end nodes 110 comprises the first front-end node 111.

The client node 101 may operate in the communications network 100 over the diameter protocol.

The method may comprise one or more of the following actions. In some embodiments all the actions may be performed. In some embodiments, one or more actions may be performed. One or more embodiments may be combined, where applicable. One or more embodiments may be combined with any of the features described in relation to the first front-end node 111 where applicable. All possible combinations are not described to simplify the description. In FIG. 5, optional actions are indicated with dashed lines.

Action 501

The client node 101, in this Action 501, may receive, from the first front-end node 111, the first response to the first request for data from the client node 101. As described in Action 402, the first response comprises the first indication indicating that the first front-end node 111 is the preferred node for providing the subsequent response to the subsequent request for data from the client node 101. The subsequent response is allowed to originate from the another front-end node 112 in the pool of front-end nodes 110, the another front-end node 112 being different than the preferred node.

The subsequent request may be understood to be subsequent to the first request, and the subsequent response may be understood to be subsequent to the first response.

The first response may be received via the load balancer node 130. Therefore, client node 101 may receive the first response via the first link 141 and the second link 142.

Action 502

In this Action 502, the client node 101 provides an indication, wherein the indication may be understood to be a second indication, to the load balancer node 130 operating in the communications network 100. The second indication indicates that the first front-end node 111 is the preferred node for providing a response, which may be understood as the subsequent response, to a request for data from the database 120, which request may be understood as the subsequent request, the subsequent request being from the client node 101. The second indication may indicate this by indicating that: i) the first front-end node 111 is a destination host for providing the subsequent response to the subsequent request for data from the database 120, and that ii) if the first front-end node 111 is unavailable, the another front-end node 112 is allowed to be selected from the pool of front-end nodes 110 to provide the subsequent response, the different front-end node 112 being available.

The second indication may be understood as a further, new, diameter AVP in the subsequent request from the client node 101 to indicate that if the preferred first front-end node 111 is not available, this preferred first front-end node 111 made sure, by updating user data in the UDR, that other Front-Ends in the pool of front-end nodes 110 such as the another front-end node 112 may serve the user anyway.

The further diameter AVP may be understood as a second AVP. For example, in the diameter protocol, the second AVP may be understood as a realm-routing-allowed AVP. The second AVP may for example, may be indicated by a value of "1" indicating "Realm routing allowed".

The providing in this Action 502 of the second indication may be understood to be based on the received first indication. That is, the providing of the second indication may be understood to be triggered or enabled by the received first indication.

Action 503

In this Action 503, the client node 101 receives the subsequent response to the subsequent request for data. The subsequent response is based on the provided second indication. This may be understood as that the front-end in the pool of front-end nodes 110 that may provide the subsequent response may have been selected, by the load balancer node 130, based on the provided second indication.

The subsequent response may be received, via the load balancer node 130, from at least one of: the first front-end node 111 and the another front-end node 112. Hence, the subsequent response may be received via any of the first link 141, the second link 142 and the third link 143.

Figure 6:
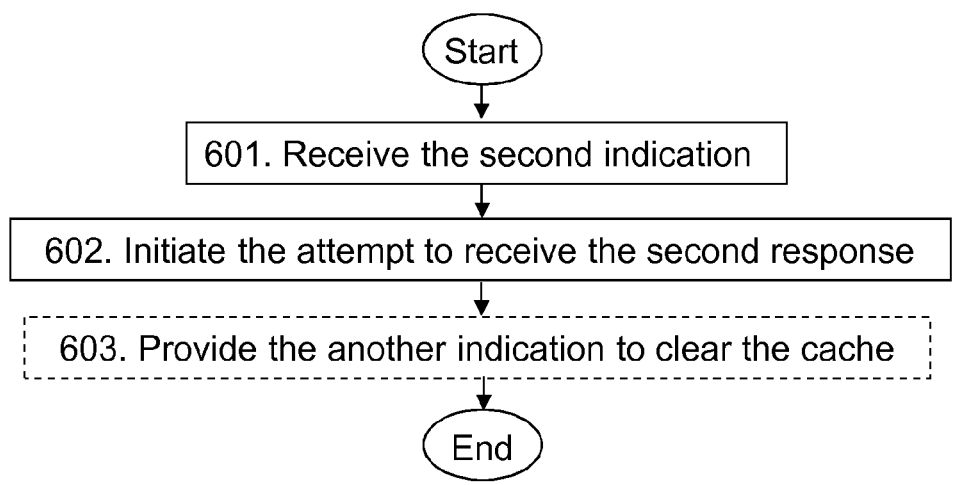
FIG. 6 is a flowchart depicting embodiments of a method in a load balancer node, according to embodiments herein.

Embodiments of a method, performed by the load balancer node 130, for supporting data communication will now be described with reference to the flowchart depicted in FIG. 6. As stated earlier, the load balancer node operates in the communications network 100. The load balancer node 130 may operate in the communications network 100 over the diameter protocol The detailed description of some of the following corresponds to the same references provided above, in relation to the actions described for the first front-end node 111, and will thus not be repeated here. For example, the communications network 100 comprises the pool of front-end nodes 110 for providing access to the database 120, and the pool of front-end nodes 110 comprises the first front-end node 111. One or more embodiments may be combined with any of the features described in relation to the first front-end node 111 and/or the client node 101, where applicable. All possible combinations are not described to simplify the description. In FIG. 6, optional actions are indicated with dashed lines.

Action 601

In this Action 601, the load balancer node 130 may receive, from the first front-end node 111, the first response to the first request for data from the client node 101. The first response comprises the first indication indicating that the first front-end node 111 is the preferred node for providing the subsequent response to the subsequent request for data from the client node 101, and that the subsequent response is allowed to originate from the another front-end node 112, the another front-end node 112 being different than the preferred node.

The receiving in this Action 601 may be implemented, e.g., via the second link 142.

Action 602

In this Action 603, the load balancer node 130 may provide the received first indication to the client node 101, e.g., via the first link 141. Providing may be understood here as transparently sending or forwarding.

Action 603

In this Action 603, the load balancer node 130 receives the second indication from the client node 101 operating in the communications network 100, wherein the second indication is the second indication. The second indication indicates that the first front-end node 111 is the preferred node for providing the subsequent response to the subsequent request for data from the database 120, the subsequent request being from the client node 101. The subsequent response is the subsequent response to the first response for data from the client node 101. The second indication indicates this by indicating that: i) the first front-end node 111 is the destination host for providing the subsequent response to the subsequent request for data from the database 120, and ii) if the first front-end node 111 is unavailable, the another front-end node 112, the another front-end node 112 being available, is allowed to be selected from the pool of front-end nodes 110 to provide the subsequent response.

The receiving in this Action 603 may be implemented, e.g., via the first link 141.

The receiving 603 of the second indication may be understood to be based on the provided first indication. That is, the receiving of the second indication may be understood to be a consequence of, or subsequent to, the received first indication.

Action 604

In this Action 604, the load balancer node 130 initiates, based on the received second indication and in response to the subsequent request for data from the client node 101, an attempt to receive the subsequent response to the subsequent request for data. The reception of the subsequent response is first attempted from the first front-end node 111. One of the following situations may occur: i) the first front-end node 111 is available and the subsequent response is successfully received from the first front-end node 111, or ii) the first front-end node 111 is unavailable and the subsequent request is re-routed to the another front-end node 112, the another front-end node 112 being available. The another front-end node 112 is, in this situation, selected by the load balancer node 130 from the pool of front-end nodes 110 to provide the subsequent response.

Action 605

If the first front-end node 111 is unavailable and the subsequent request is re-routed to the another front-end node 112, in this Action 605, the load balancer node 130 may provide, to the another front-end node 112, another indication indicating to clear a cache saved from a previous request from the client node 101 to the another front-end node 112. Providing may be understood here as sending, e.g., via the third link 143. The another indication may be understood as a third indication. The third indication may be yet another new diameter AVP in a request from the load balancer node 130 to the another front-end node 112, to indicate that there was a previous failover towards another front-end, the first front-end node 111, and that all data cached, if any, should be cleared before serving the subsequent request, to avoid the risk of using obsolete data.

The yet another new diameter AVP may be understood as a third AVP. For example, in the diameter protocol, the third AVP may be understood as a failback-host AVP. The third AVP may for example, may be indicated by a value of "1" indicating "Failback performed". When the AVP may take this value, it may be understood by the receiving server, here the second front-end node 112, that a previous failover took place towards another diameter server, here, the first front-end node 111, which means that the all user data local copy/cache may need to be cleared and fetched again from UDR to run the business logic with the most recent user data.

According to the foregoing, one advantage of embodiments herein is that the methods described allow to have both caching and failover in UDC solutions as required by operators. In addition, they enhances the diameter protocol by introducing the concept of dynamic preference routing when it comes to diameters servers implementing business logic, which optimizes any aspect, e.g., latency, when they are selected, but not excluding alternate servers in the routing.

Figure 7:
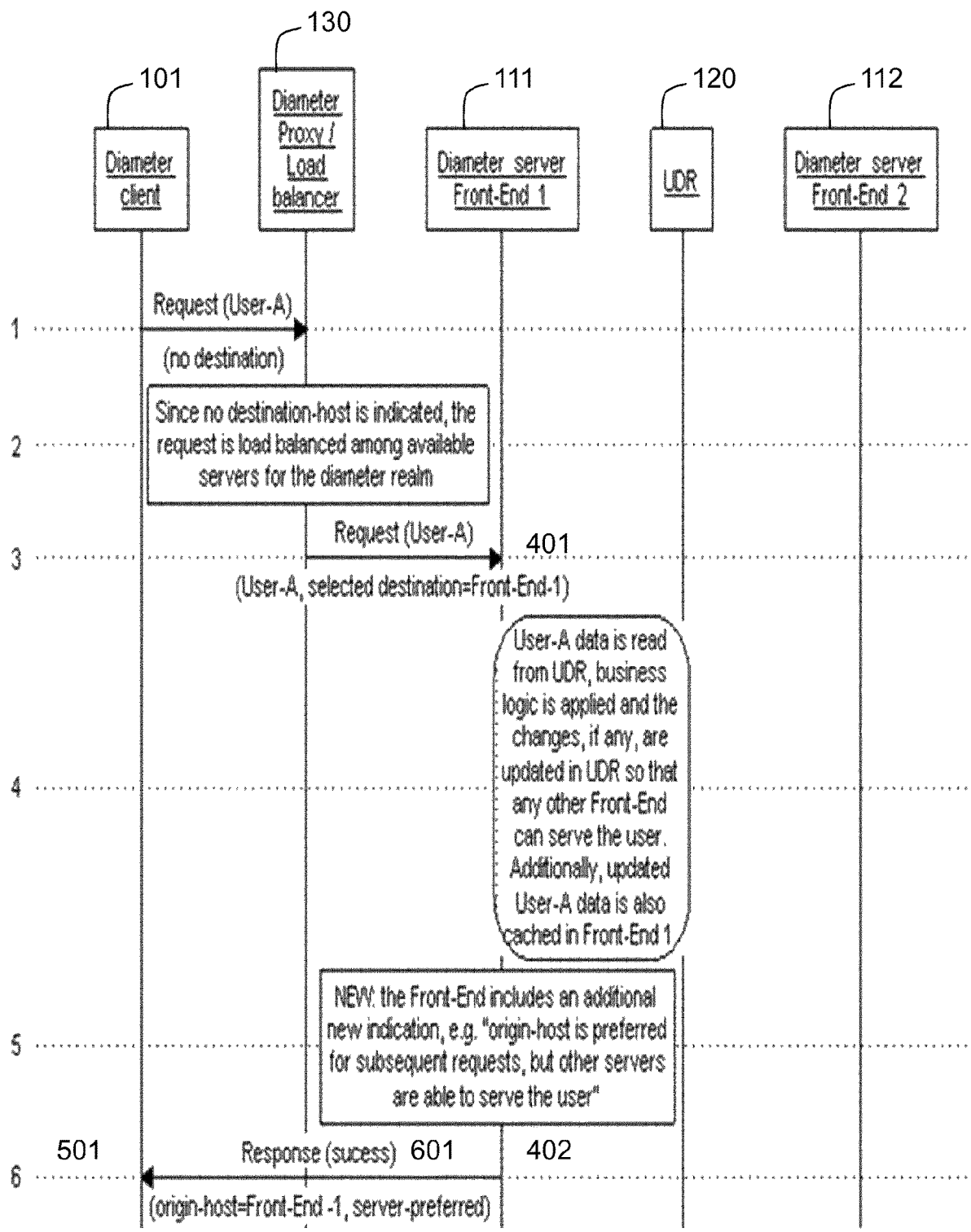
FIG. 7 is a schematic diagram illustrating an example of the different components of the communications network and their interactions, according to embodiments herein.
Figure 7:
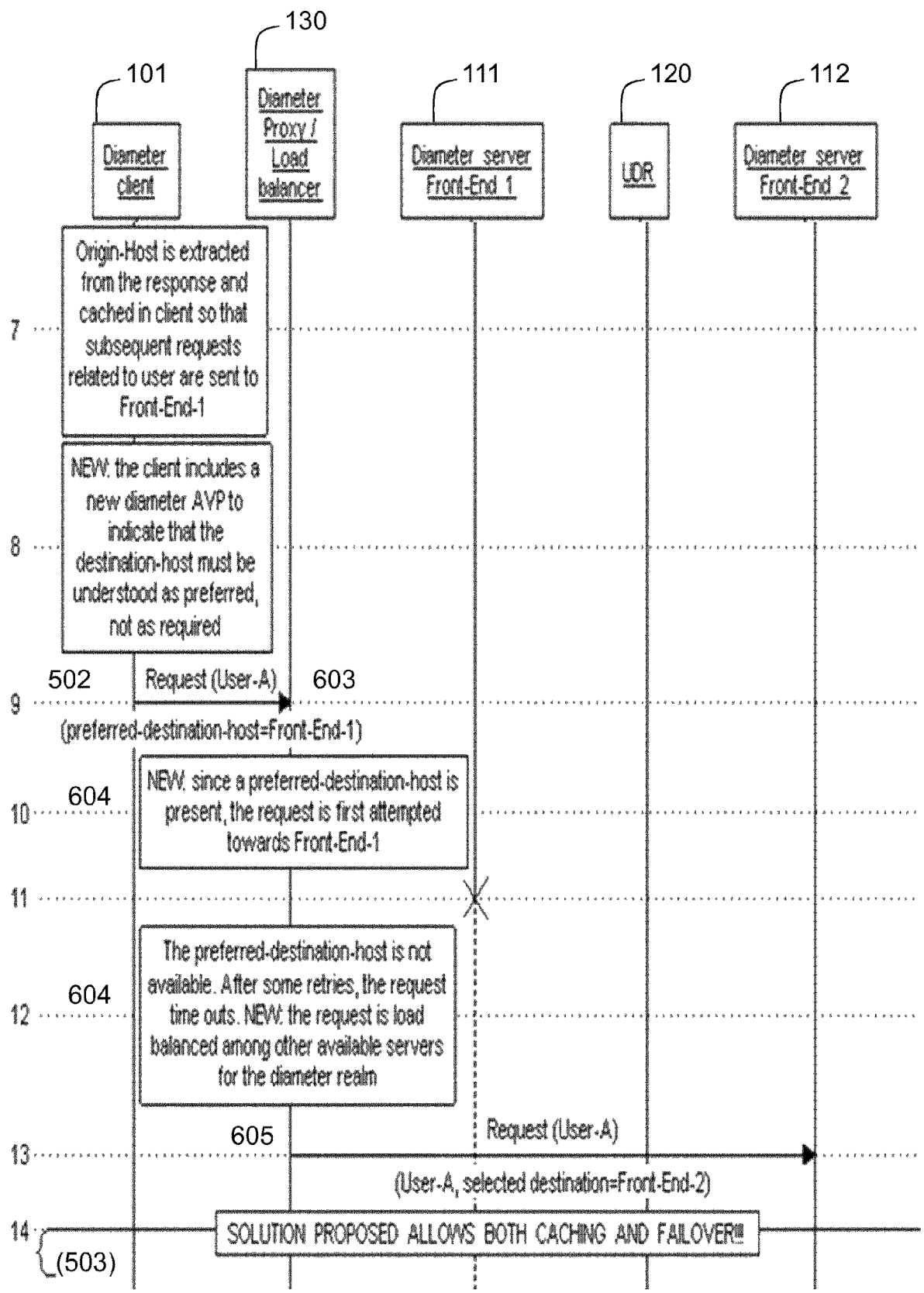

To further illustrate the embodiments herein, some particular non-limiting examples of embodiments herein will now be provided in further detail with regards to FIG. 7. FIG. 7 is a schematic block diagram of a particular non-limiting example of the communications network 100, with an overview of the actions performed, according to embodiments herein. In FIG. 7, the client node 101 is a diameter client, the load balancer node 130 is a diameter proxy, the first front-end node 111 is a first diameter server, the another front-end node 112 is another diameter server, and the database 120 is a UDR.

Steps 1-4 may be understood as corresponding to steps as in FIGS. 1 and 2 and will therefore not be described again. In Step 3, the first front-end node 111 receives, according to Action 401 the first request for data from the client node 101.

In steps 5-6, in addition to the normal response, the first indication, in the form of a new diameter AVP, is returned to the client node 101 according to Action 402, so that the client is aware about the possible routing aspects. In this example, the first indication may be equivalent to indicating: "I'd like to serve this user whenever is possible, since I'm sure I'll be more efficient than other diameter servers. If it's not possible, please select any alternate server for the same realm, since I made sure that others are able to access the same user data I am currently managing". The first response comprising the first indication is received by the load balancer node 130 according to Action 601, and then by the client node 101 according to Action 501.

In steps 7-9, since the first indication is received, the client node 101 stores the origin-host, but it also stores a "preferred" mark, not a "needed" mark for the first front-end node 111, as stated in the current IETF RFC 6733. This may result in subsequent requests containing a new indication, the second indication, in the form of a new AVP, about the "preference", that is, that the destination-host, here the first front-end node 111, is preferred, which is equivalent to indicate "realm routing allowed". The second indication is provided to the load balancer node 130 according to Action 502, and it is received by the load balancer node 130, according to Action 603. The load balancer node 130 receives both the destination-host and the second indication.

In steps 10-13, the load balancer node 130, based on the received second indication, and according to Action 604, first tries to send the request towards the destination-host, that is, the first front-end node 111. Since the first front-end node 111 is not reachable in this example, based on the second indication, it performs a fall back to diameter realm routing to select another front-end node from the pool of front-end nodes 110, that is, the another front-end node 112.

As may be appreciated in FIG. 7, embodiments herein achieve signaling efficiency, optimized response times, and/or robustness whenever is possible, as desired by operators in any network.

It may be highlighted that a diameter server implementing embodiments herein such as the first front-end node 111 may also need to ensure that there are no inconsistencies across the rest of diameter servers, that is, server failures, connectivity failures, etc. If detected, as in step 11, it may result in flushing/clearing of all the local copies stored/cached for a user since it may not be ensured anymore that the cached user data is the most recent. That is, a failover may have occurred to another server which updated the user data in UDR. Accordingly, another new indication/AVP may be additionally defined in embodiments herein as the third indication, to alert a diameter server such as the second front-end node 112, that a failover was performed and ensure that, even if no failure was not detected by the second front-end node 112, that the load balancer node 130 performed a failover and a failback. A failback may be understood as restoring the traffic towards a front-end which was assumed to have failed but it is now recovered.

It must also be noted that IETF currently defines a Redirect-Host-Usage AVP, which requires the presence of a redirect diameter agent in the diameter path increasing the latency of the requests, since it mandates an extra round-trip for every initial request. A redirect agent may be understood as a diameter node that responds to the client node with a list of one or several front-ends, so that the client node may send then directly the request towards them. A redirect agent may be understood to just receive the request from the client node, and immediately respond with the list of front-ends. The round-trip may be understood to receive its name because first the client sends the request to the redirect agent, and then, when the agent responds, the client sends the request again, but to a front-end received in the response. Hence, there are two requests sent by the client node, instead of one. That is the main reason why no diameter redirect agent is used in operators' networks in existing methods. Further, this agent is not aware of the diameter server capabilities/implementation in a dynamic fashion, i.e. the agent may need to be provisioned/pre-configured with all the users and network information in a static manner, whereas according to the embodiments herein, no operator intervention may be needed. As an example, if the first front-end node 111 exhausts its cache, a new initial request may not result in user data locally kept/cached, so the new indication in the response may advertise that any server is valid for the user, without a particular preference, e.g., by the first indication taking the value "2", as discussed above for some examples.

Figure 8:
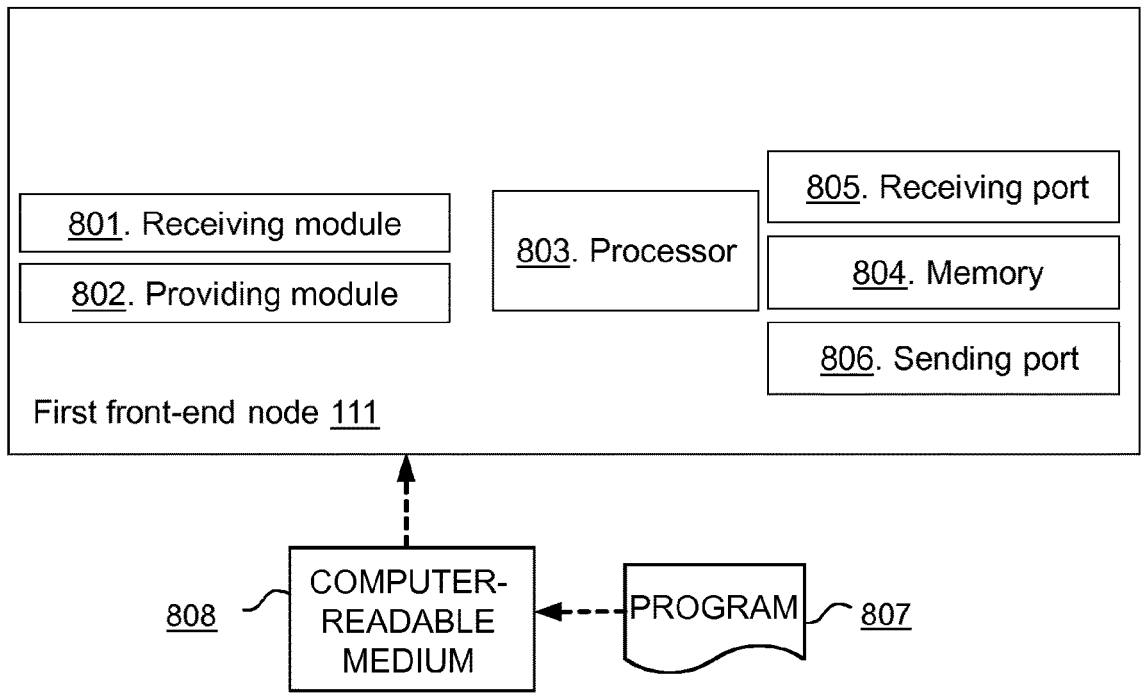
FIG. 8a is a schematic block diagram illustrating an example of a first front-end node, according to embodiments herein.
FIG. 8b is a schematic block diagram illustrating another example of a first front-end node, according to embodiments herein.
Figure 8:
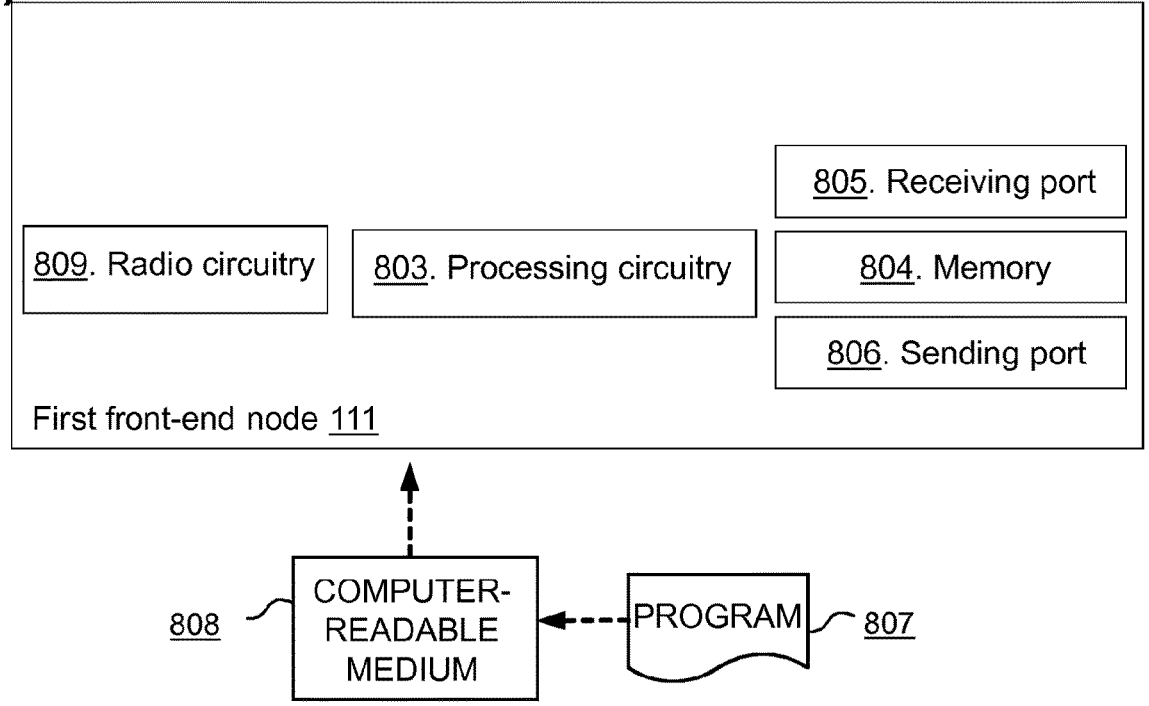

To perform the method actions described above in relation to FIG. 4 and FIG. 7, the first front-end node 111 configured to support data communication may comprise the following arrangement depicted in FIG. 8a. As stated earlier, the first front-end node 111 is further configured to operate in the communications network 100.

The detailed description of some of the following corresponds to the same references provided above, in relation to the actions described for the first front-end node 111, and will thus not be repeated here. For example, the communications network 100 is configured to comprise the pool of front-end nodes 110, which are configured to provide access to the database 105. The pool of front-end nodes 110 comprise the first front-end node 111.

It should be noted that the examples herein are not mutually exclusive. Components from one example may be tacitly assumed to be present in another example and it will be obvious to a person skilled in the art how those components may be used in the other examples.

The first front-end node 111 is further configured to, e.g., by means of a receiving module 801 configured to, receive, from the load balancer node 130, the first request for data from the database 120. The first request for data is configured to be from the client node 101. The load balancer node 130 and the client node 101 are further configured to operate in the communications network 100.

The first front-end node 111 is further configured to, e.g., by means of a providing module 802 configured to, provide, to the client node 101, the first response to the first request configured to be received. The first response is configured to comprise the first indication configured to indicate that the first front-end node 111 is the preferred node for providing the subsequent response to the subsequent request for data from the client node 101. The subsequent response is configured to be allowed to originate from the another front-end node 112 in the pool of front-end nodes 110, the another front-end node 112 being different than the preferred node.

In some embodiments, the first response is configured to be provided to the client node 101 via the load balancer node 130.

The first front-end node 111 may be further configured to operate in the communications network 100 over the diameter protocol.

The embodiments herein may be implemented through one or more processors, such as the processor 803 in the first front-end node 111 depicted in FIG. 8a, together with computer program code for performing the functions and actions of the embodiments herein. The processor 803 may be understood herein as a hardware component of the first front-end node 111, and may be referred to herein as a processing circuitry 803. The program code mentioned above may also be provided as a computer program product, for instance in the form of a data carrier carrying computer program code for performing the embodiments herein when being loaded into the in the first front-end node 111. One such carrier may be in the form of a CD ROM disc. It is however feasible with other data carriers such as a memory stick. The computer program code may furthermore be provided as pure program code on a server and downloaded to the first front-end node 111.

The first front-end node 111 may further comprise a memory 804 comprising one or more memory units. The memory 804 is arranged to be used to store obtained information, store data, configurations, and applications etc. to perform the methods herein when being executed in the first front-end node 111.

In some embodiments, the first front-end node 111 may receive information from the load balancer node 130, database 120, and/or another node in the communications network 100, through a receiving port 805. In some examples, the receiving port 805 may be, for example, connected to one or more antennas in first front-end node 111. In other embodiments, the first front-end node 111 may receive information from another structure in the communications network 100 through the receiving port 805. Since the receiving port 805 may be in communication with the processing circuitry 803, the receiving port 805 may then send the received information to the processing circuitry 803. The receiving port 805 may also be configured to receive other information from other communication devices or structures in the communications network 100.

The processing circuitry 803 in the first front-end node 111 may be further configured to transmit or send information to e.g., the load balancer node 130, database 120, and/or another node in the communications network 100, the client node 101, and/or any another node in the communications network 100, through a sending port 806, which may be in communication with the processing circuitry 803, and the memory 804.

Those skilled in the art will also appreciate that the receiving module 801, and the providing module 802 described above may refer to a combination of analog and digital modules, and/or one or more processors configured with software and/or firmware, e.g., stored in memory, that, when executed by the one or more processors, such as the processing circuitry 803, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-802 described above may be implemented as one or more applications running on one or more processors such as the processing circuitry 803.

Thus, the methods according to the embodiments described herein for the first front-end node 111 may be respectively implemented by means of a computer program 807 product, comprising instructions, i.e., software code portions, which, when executed on at least one processing circuitry 803, cause the at least one processing circuitry 803 to carry out the action described herein, as performed by the first front-end node 111. The computer program 807 product may be stored on a computer-readable storage medium 808. The computer-readable storage medium 808, having stored thereon the computer program 807, may comprise instructions which, when executed on at least one processing circuitry 803, cause the at least one processing circuitry 803 to carry out the action described herein, as performed by the first front-end node 111. In some embodiments, the computer-readable storage medium 808 may be a non-transitory computer-readable storage medium, such as a CD ROM disc, or a memory stick. In other embodiments, the computer program 807 product may be stored on a carrier containing the computer program 807 just described, wherein the carrier is one of an electronic signal, optical signal, radio signal, or the computer-readable storage medium 808, as described above.

In other examples, to perform the method actions described above in relation to FIG. 4 and FIG. 7, the first front-end node 111 may comprise the arrangement depicted in FIG. 8b. The first front-end node 111 may comprise the processing circuitry 803, in the first front-end node 111, the memory 804, the receiving port 805, the sending port 806, the program 807 and the computer-readable medium 808.

Figure 4:
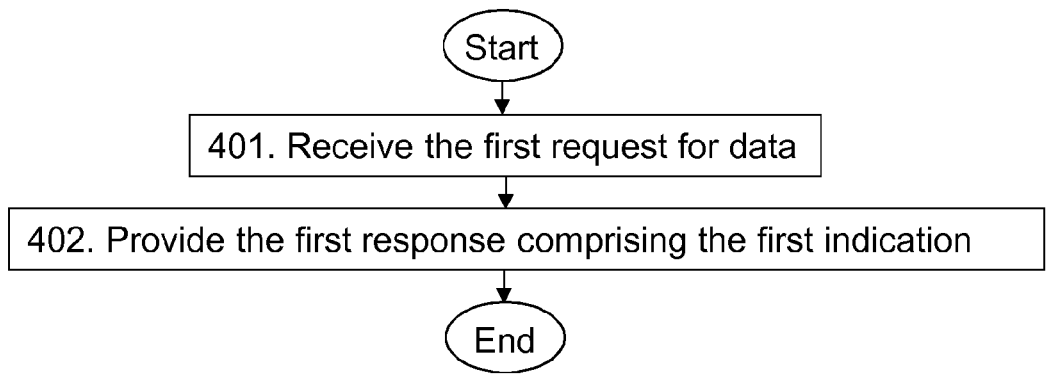
FIG. 4 is a flowchart depicting embodiments of a method in a first front-end node, according to embodiments herein.

The memory 804 may comprise instructions executable by the processing circuitry 803 whereby the first front-end node 111 may be configured to perform one or more of the method actions according to FIG. 4 and FIG. 7.

Figure 9:
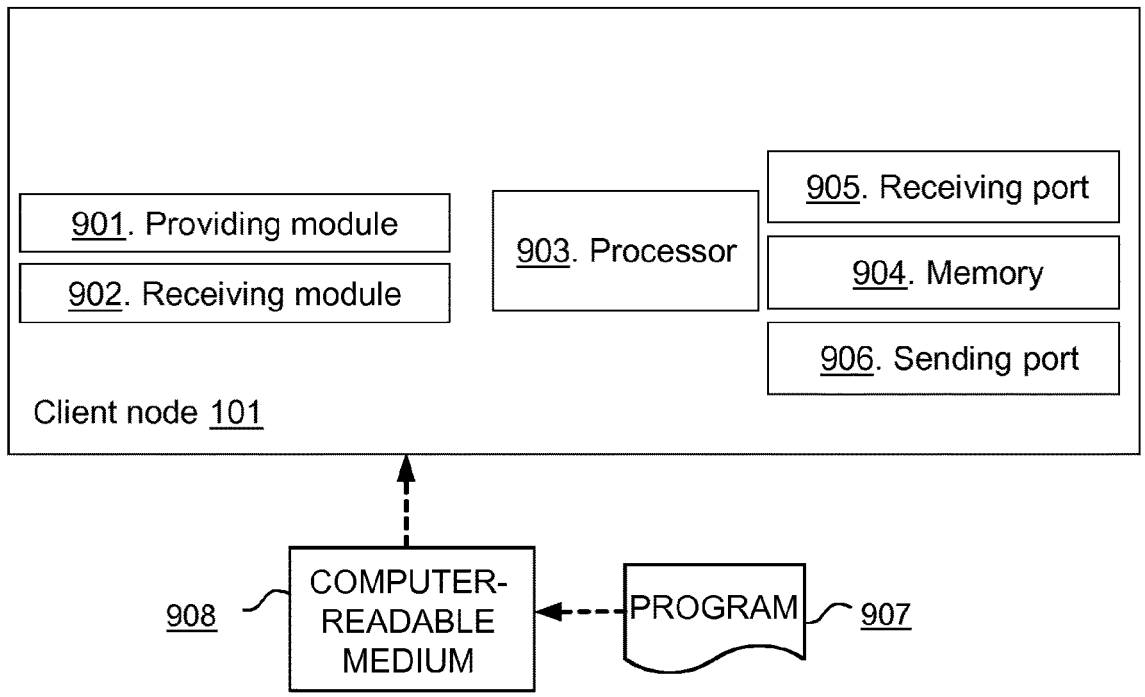
FIG. 9a is a schematic block diagram illustrating an example of a client node, according to embodiments herein.
FIG. 9b is a schematic block diagram illustrating another example of a client node, according to embodiments herein.
Figure 9:
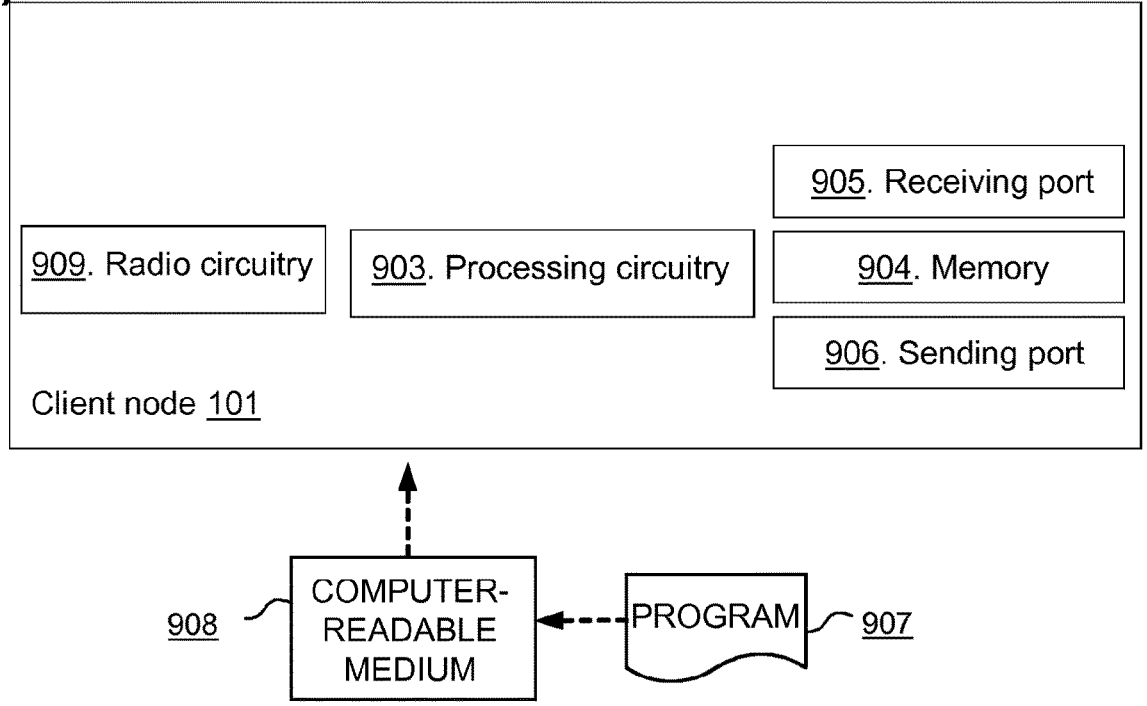

To perform the method actions described above in relation to FIG. 5 or FIG. 7, the client node 101 configured to support data communication, may comprise the following arrangement depicted in FIG. 9a. As stated earlier, the client node 101 is further configured to operate in the communications network 100. The client node 101 may be configured to operate in the communications network 100 over the diameter protocol.

The detailed description of some of the following corresponds to the same references provided above, in relation to the actions described for the client node 101, and will thus not be repeated here. For example, the communications network 100 is configured to comprise the pool of front-end nodes 110 for providing access to the database 120. The pool of front-end nodes 110 comprises the first front-end node 111.

It should be noted that the examples herein are not mutually exclusive. Components from one example may be tacitly assumed to be present in another example and it will be obvious to a person skilled in the art how those components may be used in the other examples.

The client node 101 is configured to, e.g., by means of a providing module 901 configured to, provide the second indication to the load balancer node 130 configured to operate in the communications network 100. The second indication is configured to indicate that the first front-end node 111 is the preferred node for providing the subsequent response to the subsequent request for data from the database 120. The request is configured to be from the client node 101, by indicating that: i) the first front-end node 111 is the destination host for providing the subsequent response to the subsequent request for data from the database 120, and ii) if the first front-end node 111 is unavailable, the another front-end node 112 is allowed to be selected from the pool of front-end nodes 110 to provide the subsequent response, the different front-end node 104 being available.

The client node 101 is further configured to, e.g., by means of a receiving module 902 configured to, receive the subsequent response to the subsequent request for data, the subsequent response being configured to be based on the second indication configured to be provided.

The subsequent request may be subsequent to the first request, the subsequent response may be subsequent to the first response, and the second indication to the load balancer node 130 from the client node 101 may be understood as the second indication.

The subsequent response may be configured to be received, via the load balancer node 130, from at least one of: the first front-end node 111 and the another front-end node 112.

The client node 101 may be further configured to, e.g., by means of the receiving module 902 configured to, receive, from the first front-end node 111, the first response to the first request for data from the client node 101. The first response is configured to comprise the first indication configured to indicate that the first front-end node 111 is the preferred node for providing the subsequent response to the subsequent request for data from the client node 101. The subsequent response is allowed to originate from the another front-end node 112 in the pool of front-end nodes 110, the another front-end node 112 being different than the preferred node. To provide the second indication is configured to be based on the first indication configured to be received.

The first response may be configured to be received via the load balancer node 130.

The embodiments herein may be implemented through one or more processors, such as a processor 903 in the client node 101 depicted in FIG. 9a, together with computer program code for performing the functions and actions of the embodiments herein. The processor 903 may be understood herein as a hardware component of the client node 101, and may be referred to herein as a processing circuitry 903. The program code mentioned above may also be provided as a computer program product, for instance in the form of a data carrier carrying computer program code for performing the embodiments herein when being loaded into the in the client node 101. One such carrier may be in the form of a CD ROM disc. It is however feasible with other data carriers such as a memory stick. The computer program code may furthermore be provided as pure program code on a server and downloaded to the client node 101.

The client node 101 may further comprise a memory 904 comprising one or more memory units. The memory 904 is arranged to be used to store obtained information, store data, configurations, schedulings, and applications etc. to perform the methods herein when being executed in the client node 101.

In some embodiments, the client node 101 may receive information from the load balancer node 130, the first front-end node 111, the another front-end node 112 and/or another node, through a receiving port 905. In some examples, the receiving port 905 may be, for example, connected to one or more antennas in client node 101. In other embodiments, the client node 101 may receive information from another structure in the communications network 100 through the receiving port 905. Since the receiving port 905 may be in communication with the processing circuitry 903, the receiving port 905 may then send the received information to the processing circuitry 903. The receiving port 905 may also be configured to receive other information.

The processing circuitry 903 in the client node 101 may be further configured to transmit or send information to e.g., load balancer node 130, the first front-end node 111, the another front-end node 112 and/or another node, through a sending port 906, which may be in communication with the processing circuitry 903, and the memory 904.

Those skilled in the art will also appreciate that the providing module 901 and the receiving module 902 described above may refer to a combination of analog and digital modules, and/or one or more processors configured with software and/or firmware, e.g., stored in memory, that, when executed by the one or more processors such as the processing circuitry 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-902 described above may be implemented as one or more applications running on one or more processors such as the processing circuitry 903.

Thus, the methods according to the embodiments described herein for the client node 101 may be respectively implemented by means of a computer program 907 product, comprising instructions, i.e., software code portions, which, when executed on at least one processing circuitry 903, cause the at least one processing circuitry 903 to carry out the action described herein, as performed by the client node 101. The computer program 907 product may be stored on a computer-readable storage medium 908. The computer-readable storage medium 908, having stored thereon the computer program 907, may comprise instructions which, when executed on at least one processing circuitry 903, cause the at least one processing circuitry 903 to carry out the action described herein, as performed by the client node 101. In some embodiments, the computer-readable storage medium 908 may be a non-transitory computer-readable storage medium 908, such as a CD ROM disc, or a memory stick. In other embodiments, the computer program 907 product may be stored on a carrier containing the computer program 907 just described, wherein the carrier is one of an electronic signal, optical signal, radio signal, or the computer-readable storage medium 908, as described above.

In other examples, to perform the method actions described above in relation to FIG. 5 and FIG. 7, the client node 101 may comprise the following arrangement depicted in FIG. 9b. The client node 101 may comprise the processing circuitry 903, in the client node 101, the memory 904, the receiving port 905, the sending port 906, the program 907 and the computer-readable medium 908. The memory 904 may comprise instructions executable by the processing circuitry 903 whereby the client node 101 may be configured to perform one or more of the method actions according to FIG. 5 and FIG. 7.

Figure 10:
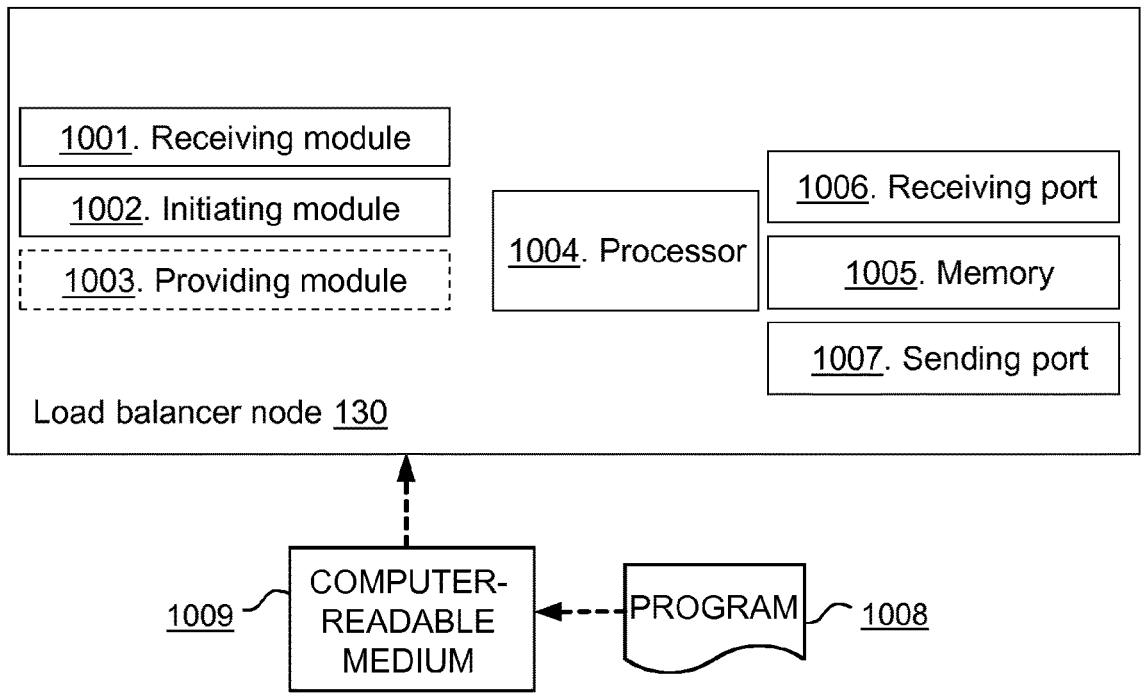
FIG. 10a is a schematic block diagram illustrating an example of a load balancer node, according to embodiments herein.
FIG. 10b is a schematic block diagram illustrating another example of a load balancer node, according to embodiments herein.
Figure 10:
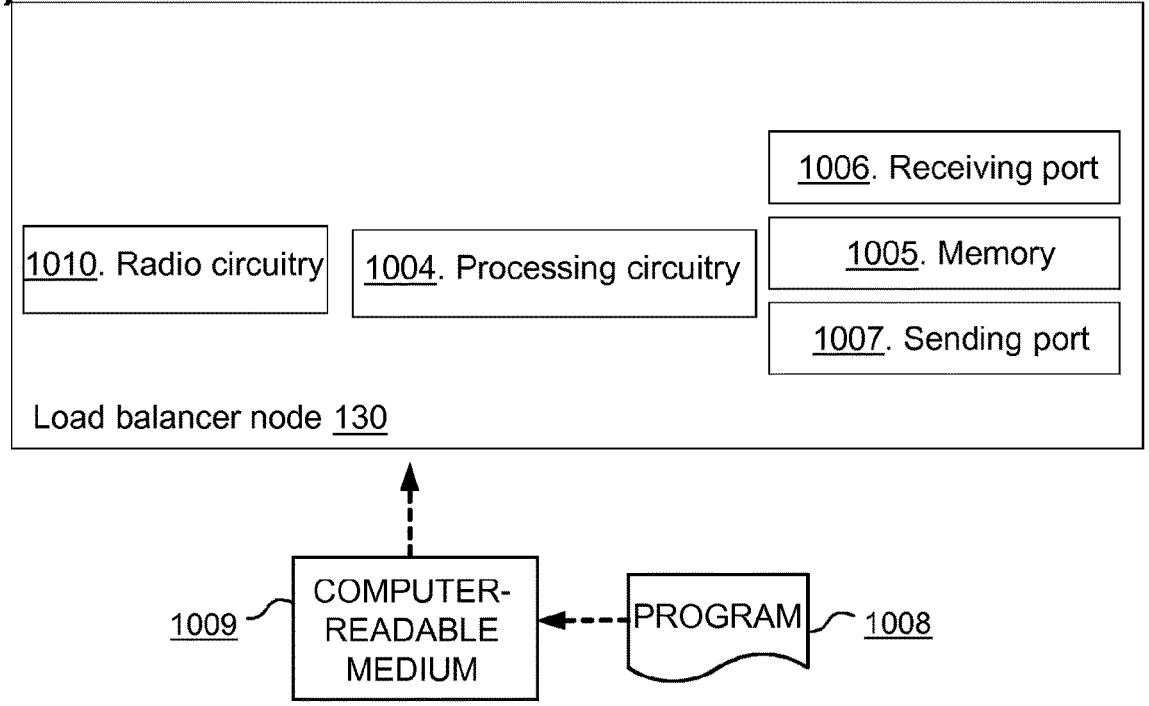

To perform the method actions described above in relation to FIG. 6 and FIG. 7, the load balancer node 130 configured to support data communication, may comprise the following arrangement depicted in FIG. 10a. As stated earlier, the load balancer node is configured to operate in the communications network 100. The load balancer node 130 may be configured to operate in the communications network 100 over the diameter protocol.

The detailed description of some of the following corresponds to the same references provided above, in relation to the actions described for the load balancer node 130, and will thus not be repeated here. For example, the communications network 100 is configured to comprise the pool of front-end nodes 110 for providing access to the database 120. The pool of front-end nodes 110 is configured to comprise the first front-end node 111.

It should be noted that the examples herein are not mutually exclusive. Components from one example may be tacitly assumed to be present in another example and it will be obvious to a person skilled in the art how those components may be used in the other examples.

The load balancer node 130 is configured to, e.g., by means of a receiving module 1001 configured to, receive the second indication from the client node 101 configured to operate in the communications network 100. The second indication is configured to indicate that the first front-end node 111 is the preferred node for providing the subsequent response to the subsequent request for data from the database 120. The subsequent request is configured to be from the client node 101, by indicating that: i) the first front-end node 111 is the destination host for providing the subsequent response to the subsequent request for data from the database 120, and ii) if the first front-end node 111 is unavailable, the another front-end node 112, the another front-end node 112 being available, is allowed to be selected from the pool of front-end nodes 110 to provide the subsequent response.

In some embodiments, the load balancer node 130 may be further configured to e.g., by means of the receiving module 1001 configured to, receive, from the first front-end node 111, the first response to the first request for data from the client node 101, the first response being configured to comprise the first indication configured to indicate that the first front-end node 111 is the preferred node for providing the subsequent response to the subsequent request for data from the client node 101, and the subsequent response is allowed to originate from the another front-end node 112, the another front-end node 112 being different than the preferred node. To receive the second indication may be configured to be based on the first indication configured to be provided.

The load balancer node 130 is further configured to, e.g., by means of an initiating module 1002 configured to, initiate, based on the second indication configured to be received, and in response to the subsequent request for data from the client node 101, the attempt to receive the subsequent response to the subsequent request for data. The reception of the subsequent response is configured to be first attempted from the first front-end node 111, and one of: i) if the first front-end node 111 is available, the subsequent response is configured to be successfully received from the first front-end node 111, and ii) if the first front-end node 111 is unavailable, the subsequent request is configured to be re-routed to the another front-end node 112, the another front-end node 112 being configured to be available, and the another front-end node 112 is configured to be selected by the load balancer node 130 from the pool of front-end nodes 110 to provide the subsequent response.

In some embodiments, if the first front-end node 111 is unavailable, the subsequent request may be configured to be re-routed to the another front-end node 112, and the load balancer node 130 may be further configured to, e.g., by means of a providing module 1003 configured to, provide, to the another front-end node 112, the another indication configured to indicate to clear the cache configured to be saved from the previous request from the client node 101 to the another front-end node 112.

In some embodiments, the load balancer node 130 may be further configured to, e.g., by means of the providing module 1003 configured to, provide the first indication configured to be received, to the client node 101.

The embodiments herein may be implemented through one or more processors, such as a processor 1004 in the load balancer node 130 depicted in FIG. 9a together with computer program code for performing the functions and actions of the embodiments herein. The processor 1004 may be understood herein as a hardware component of the load balancer node 130, and may be referred to herein as a processing circuitry 1004. The program code mentioned above may also be provided as a computer program product, for instance in the form of a data carrier carrying computer program code for performing the embodiments herein when being loaded into the in the load balancer node 130. One such carrier may be in the form of a CD ROM disc. It is however feasible with other data carriers such as a memory stick. The computer program code may furthermore be provided as pure program code on a server and downloaded to the load balancer node 130.

The load balancer node 130 may further comprise a memory 1005 comprising one or more memory units. The memory 1005 is arranged to be used to store obtained information, store data, configurations, schedulings, and applications etc. . . . to perform the methods herein when being executed in the load balancer node 130.

In some embodiments, the load balancer node 130 may receive information from the client node 101, the first front-end node 111, the another front-end node 112 and/or another node, through a receiving port 1006. In some examples, the receiving port 1006 may be, for example, connected to one or more antennas in load balancer node 130. In other embodiments, the load balancer node 130 may receive information from another structure in the communications network 100 through the receiving port 1006. Since the receiving port 1006 may be in communication with the processing circuitry 1004, the receiving port 1006 may then send the received information to the processing circuitry 1004. The receiving port 1006 may also be configured to receive other information.

The processing circuitry 1004 in the second node 102 may be further configured to transmit or send information to e.g., client node 101, the first front-end node 111, the another front-end node 112 and/or another node described above, through a sending port 1007, which may be in communication with the processing circuitry 1004, and the memory 1005.

Those skilled in the art will also appreciate that the receiving module 1001, the initiating module 1002 and the providing module 1003 described above may refer to a combination of analog and digital modules, and/or one or more processors configured with software and/or firmware, e.g., stored in memory, that, when executed by the one or more processors such as the processing circuitry 1004, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1003 described above may be implemented as one or more applications running on one or more processors such as the processing circuitry 1004.

Thus, the methods according to the embodiments described herein for the load balancer node 130 may be respectively implemented by means of a computer program 1008 product, comprising instructions, i.e., software code portions, which, when executed on at least one processing circuitry 1004, cause the at least one processing circuitry 1004 to carry out the action described herein, as performed by the load balancer node 130. The computer program 1008 product may be stored on a computer-readable storage medium 1009. The computer-readable storage medium 1009, having stored thereon the computer program 1008, may comprise instructions which, when executed on at least one processing circuitry 1004, cause the at least one processing circuitry 1004 to carry out the actions described herein, as performed by the load balancer node 130. In some embodiments, the computer-readable storage medium 1009 may be a non-transitory computer-readable storage medium 1009, such as a CD ROM disc, or a memory stick. In other embodiments, the computer program 1008 product may be stored on a carrier containing the computer program 1008 just described, wherein the carrier is one of an electronic signal, optical signal, radio signal, or the computer-readable storage medium 1009, as described above.

In other examples, to perform the method actions described above in relation to FIG. 6 and FIG. 7, the load balancer node 130 may comprise the following arrangement depicted in FIG. 10*b*. The load balancer node 130 may comprise the processing circuitry 1004, in the load balancer node 130, the memory 1005, the receiving port 1007, the sending port 1006, the program 1008 and the computer-readable medium 1009. The memory 1005 may comprise instructions executable by the processing circuitry 1004 whereby the load balancer node 130 may be configured to perform one or more of the method actions according to FIG. 6 and FIG. 7.

According to the foregoing, some examples of embodiments herein may also comprise a carrier comprising any of the first indication, the second indication and the third indication, as respectively described above, wherein the carrier is one of an electronic signal, optical signal, radio signal, or computer readable storage medium.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

It may be noted that in the following claims, any of the subsequent request, the subsequent response and the second indication may be referred to, respectively, as the request, the response, and the indication, if no particular reference to the first request, the first response and the first indication is made before for a particular entity.

The invention claimed is:

1. A method, performed by a system, for supporting data communication, the system operating in a communications network and comprising a load balancer node and pool of front-end nodes for providing access to a database, the pool of front-end nodes comprising a first front-end node, the method comprising:

receiving, at the load balancer node from a client node, a first request for data from the database, the client node operating in the communications network;

receiving, at the first front-end node from the load balancer node, the first request for data from the database; and providing, to the client node, a first response to the received first request, the first response comprising a first indication indicating that the first front-end node is a preferred node for providing a subsequent response to a subsequent request for data from the client node, the subsequent request for data comprising a second indication indicating the first front-end node is the preferred node for providing the subsequent response, the subsequent response being allowed to originate from another front-end node in the pool of front-end nodes, the another front-end node being different than the preferred node.

2. The method according to claim 1, wherein the first response is provided to the client node via the load balancer node.

3. The method according to claim 1 further comprising:

receiving, at the load balancer from the client node, the second indication the second indication further indicating that:

i. the first front-end node is a destination host for providing the subsequent response to the subsequent request for data from the database; and ii. if the first front-end node is unavailable, another front-end node, the another front-end node being available, is allowed to be selected from the pool of front-end nodes to provide the subsequent response; and initiating, based on the received second indication and in response to the subsequent request for data from the client node, an attempt to receive the subsequent response to the subsequent request for data, wherein the reception of the subsequent response is first attempted from the first front-end node, and wherein one of:
  i. the first front-end node is available and the subsequent response is successfully received from the first front-end node; and
  ii. the first front-end node is unavailable and the subsequent request is re-routed to the another front-end node, the another front-end node being available, and the another front-end node being selected by the load balancer node from the pool of front-end nodes to provide the subsequent response.

4. The method according to claim 3, wherein the first front-end node is unavailable and the subsequent request is re-routed to the another front-end node, and wherein the method further comprises:
  providing, to the another front-end node, another indication indicating to clear a cache saved from a previous request from the client node to the another front-end node.

5. The method according to claim 1, wherein the first front end node uses a diameter protocol.

6. A method, performed by a client node, for supporting data communication, the client node operating in a communications network, the communications network comprising a system having a load balancer node and a pool of front-end nodes for providing access to a database, the pool of front-end nodes comprising a first front-end node, the method comprising:
  transmitting, toward the load balancer node, a first request for data from the database; and
  receiving, from the system, a first response to the transmitted first request, the first response comprising a first indication indicating that the first front-end node is a preferred node for providing a subsequent response to a subsequent request for data from the client node, the subsequent request for data comprising a second indication indicating the first front-end node is the preferred node for providing the subsequent response, the subsequent response being allowed to originate from another front-end node in the pool of front-end nodes, the another front-end node being different than the preferred node.

7. The method according to claim 6, further comprising:
  providing the second indication to the load balancer node operating in the communications network, the second indication further indicating that:
    i. the first front-end node is a destination host for providing the subsequent response to the subsequent request for data from the database; and
    ii. if the first front-end node is unavailable, another front-end node is allowed to be selected from the pool of front-end nodes to provide the subsequent response, the another front-end node being available; and
  receiving the subsequent response to the subsequent request for data, the subsequent response being based on the provided second indication.

8. The method according to claim 7, wherein the subsequent response is received, via the load balancer node, from at least one of:
  the first front-end node; and
  the another front-end node.

9. The method according to claim 6, wherein the first response is received via the load balancer node.

10. The method according to claim 6, wherein the client node uses a diameter protocol.

11. A system configured to support data communication and to operate in a communications network, the system comprising a load balancer node and a pool of front-end nodes configured to provide access to a database, the pool of front-end nodes comprising a first front-end node,
  the load balancer node comprising first processing circuitry configured to cause the load balancer to:
    receive, from a client node, a first request for data from the database, the client node operating in the communications network;
  the first front-end node comprising second processing circuitry configured to cause the first front-end node to:
    receive, from the load balancer node, the first request for data from the database; and
    provide, to the client node, a first response to the first request, the first response comprising a first indication indicating that the first front-end node is a preferred node for providing a subsequent response to a subsequent request for data from the client node, the subsequent request for data comprising a second indication indicating the first front-end node is the preferred node for providing the subsequent response, the subsequent response being allowed to originate from another front-end node in the pool of front-end nodes, the another front-end node being different than the preferred node.

12. The system according to claim 11, wherein the first response is provided to the client node via the load balancer node.

13. The system according to claim 11, wherein operating in the communications network includes using a diameter protocol.

14. The system according to claim 11, wherein the first processing circuitry is further configured to cause the load balancer node to:
  receive, from the client node, the second indication, the second indication further indicating that:
    i. the first front-end node is a destination host for providing the subsequent response to the subsequent request for data from the database; and
    ii. if the first front-end node is unavailable, another front-end node, the another front-end node being available, is allowed to be selected from the pool of front-end nodes to provide the subsequent response; and
  initiate, based on the received second indication and in response to the subsequent request for data from the client node, an attempt to receive the subsequent response to the subsequent request for data, wherein the reception of the subsequent response is first attempted from the first front-end node, and wherein one of:
    i. if the first front-end node is available, the subsequent response is successfully received from the first front-end node; and
    ii. if the first front-end node is unavailable, the subsequent request is re-routed to the another front-end node, the another front-end node being available, and the another front-end node being selected by the load balancer node from the pool of front-end nodes to provide the subsequent response.

15. The system according to claim 14, wherein if the first front-end node is unavailable, the request is re-routed to the another front-end node, and wherein the first processing circuitry is further configured to cause the load balancer node to:
  provide, to the another front-end node, another indication configured to indicate to clear a cache configured to be saved from a previous request from the client node to the another front-end node.

16. A client node configured to support data communication and to operate in a communications network, the communications network having a system comprising a load balancer node and a pool of front-end nodes for providing access to a database, the pool of front-end nodes comprising a first front-end node, the client node comprising first processing circuitry configured to cause the client node to:
   transmit, toward the load balancer node, a first request for data from the database; and
   receive, from the system, a first response to the transmitted first request, the first response comprising a first indication indicating that the first front-end node is a preferred node for providing a subsequent response to a subsequent request for data from the client node, the subsequent request for data comprising a second indication indicating the first front-end node is the preferred node for providing the subsequent response, the subsequent response being allowed to originate from another front-end node in the pool of front-end nodes, the another front-end node being different than the preferred node.

17. The client node according to claim 16, the first processing circuitry being further configured to cause the client node to:
   provide the second indication to the load balancer node configured to operate in the communications network, the second indication indicating that:
      i. the first front-end node is a destination host for providing the subsequent response to the subsequent request for data from the database; and
      ii. if the first front-end node is unavailable, another front-end node is allowed to be selected from the pool of front-end nodes to provide the subsequent response, the another front-end node being available; and
   receive the subsequent response to the subsequent request for data, the subsequent response being based on the second indication configured to be provided.

18. The client node according to claim 17, wherein the subsequent response is received, via the load balancer node, from at least one of:
   the first front-end node; and
   the another front-end node.

19. The client node according to claim 16, wherein the first response is received via the load balancer node.

20. The client node according to claim 16, wherein operating in the communications network includes using a diameter protocol.

* * * * *